United States Patent
Sparks

(10) Patent No.: US 9,192,152 B1
(45) Date of Patent: Nov. 24, 2015

(54) PREDATOR-INTIMIDATING WALKING STICK

(71) Applicant: James Sparks, Georgetown, TX (US)

(72) Inventor: James Sparks, Georgetown, TX (US)

( * ) Notice: Subject to any disclaimer, the term of this patent is extended or adjusted under 35 U.S.C. 154(b) by 0 days.

(21) Appl. No.: 14/511,595

(22) Filed: Oct. 10, 2014

(51) Int. Cl.
*A01M 29/06* (2011.01)
*A45B 3/00* (2006.01)

(52) U.S. Cl.
CPC . *A01M 29/06* (2013.01); *A45B 3/00* (2013.01)

(58) Field of Classification Search
CPC .............. A45B 3/00; A45B 2019/008; A45B 2019/002; G09F 21/02
USPC ................. 135/66, 25.4, 25.41; 40/317, 586; 160/24, 25, 127, 351, 352
See application file for complete search history.

(56) References Cited

U.S. PATENT DOCUMENTS

| | | | | |
|---|---|---|---|---|
| 523,293 A * | 7/1894 | Smith | ............. | 40/317 |
| 696,957 A * | 4/1902 | Freeborn | ............. | 40/317 |
| 833,320 A * | 10/1906 | Gilsey | ............. | 40/317 |
| 1,060,133 A * | 4/1913 | Schmelz | ............. | 40/317 |
| 3,435,836 A * | 4/1969 | Vanzini | ............. | 135/22 |
| 3,534,752 A * | 10/1970 | Vanzini | ............. | 135/22 |
| 3,709,238 A * | 1/1973 | Leopoldi et al. | ............. | 135/15.1 |
| 4,890,571 A | 1/1990 | Gaskill | | |
| 4,895,546 A | 1/1990 | Rakonjac | | |
| 4,934,394 A * | 6/1990 | Hermanson | ............. | 135/19.5 |
| 5,065,904 A * | 11/1991 | McCaffrey et al. | ............. | 222/3 |
| 5,188,137 A * | 2/1993 | Simonelli | ............. | 135/19.5 |
| D342,378 S * | 12/1993 | Pedorella | ............. | D3/6 |
| 5,682,701 A | 11/1997 | Gammon | | |
| 6,273,111 B1 * | 8/2001 | Weiss et al. | ............. | 135/25.41 |
| D463,523 S | 9/2002 | McCombs | | |
| 6,742,470 B2 | 6/2004 | Keithly | | |
| 8,225,806 B1 * | 7/2012 | Simonelli | ............. | 135/27 |
| 8,356,614 B2 | 1/2013 | Forrester | | |
| 8,474,411 B2 | 7/2013 | Scott | | |
| 8,651,396 B2 | 2/2014 | Spearman | | |
| 2009/0038663 A1 | 2/2009 | Juslin et al. | | |
| 2011/0259272 A1 | 10/2011 | Traska et al. | | |
| 2013/0327367 A1 | 12/2013 | Lindsay et al. | | |

* cited by examiner

*Primary Examiner* — Noah Chandler Hawk
(74) *Attorney, Agent, or Firm* — Sean Christian Connolly

(57) ABSTRACT

Disclosed herein is an apparatus for deterring predators, which may be used as a walking stick until a predator is encountered. Upon encountering a predator, the apparatus allows a user to rapidly deploy a collapsible rigid structure from the interior of the hollow walking stick, which supports a membrane, or set of membranes, that display the image of a fearsome creature. The deployed apparatus may also be used as an offensive or defensive pike should a predator charge a user of the apparatus. By increasing the apparent size of a user and displaying a large image of a fearsome creature, predatory animals may be deterred by this predator-intimidating walking stick.

4 Claims, 32 Drawing Sheets

PREDATOR-INTIMIDATING WALKING STICK

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISK APPENDIX

Not Applicable

BACKGROUND OF THE INVENTION

1. Field of the Invention

The present invention is in the technical field of walking sticks. More particularly, the preferred embodiments of the present invention relate generally to walking sticks that enclose items. More particularly, the preferred embodiments of the present invention relate generally to walking sticks that can deter animals. More particularly, the preferred embodiments of the present invention relate generally to walking sticks that can deter predators, such as bears. More particularly, the preferred embodiments of the present invention relate generally to walking sticks that can deter predators by quickly displaying a large image of a fearsome creature.

2. Description of the Related Art

The broad concept of walking sticks is known. Hikers have used walking sticks for support for as long as hiking has been around.

It is also known to use hollow walking sticks. Hollow walking sticks allow the walking stick to be lighter and easier to carry. Items may also be stored in a hollow walking stick.

It is also known to enclose items in a walking stick. However, these inventions usually involve storing useful items that are complimentary to a walking stick, such as a compass, fire starter, hunting knife, or the like.

It is also known to use a device to simulate an animal. However, these inventions are usually used as decoys to attract animals during hunting or to condition prey animals to the presence of hunters.

It is also known to use a device to deter animals. However, these inventions are usually used to deter unwanted pests from food sources, such as deterring a deer or squirrel from a bird feeder.

It is also known to use an apparatus to deter predators. However, these inventions are rarely easy to carry along on a hike or may involve dangerous explosives.

It is also known to enclose a deployable predator-deterring device in a walking stick. However, these inventions primarily consist of inflatable devices, which require more material than two-dimensional images, which are limited in size due to the need to include a means of inflating the device, and which are difficult to balance on top of a walking stick. Further, once inflated, these devices cannot be effectively used to deter a charging predator.

SUMMARY OF THE INVENTION

The broad embodiments of the present invention relate generally to an apparatus for deterring predators, which may be used as a walking stick until a predator is encountered, and which, upon encountering a predator, allows a user to rapidly deploy a collapsible rigid structure from the interior of the hollow walking stick that supports a membrane, or set of membranes, displaying the image of a fearsome creature.

In the more preferred embodiments, the present invention relates to an apparatus for deterring predators, which may be used as a walking stick until a predator is encountered; which, upon encountering a predator, allows a user to rapidly deploy a collapsible rigid structure from the interior of the hollow walking stick that supports a membrane, or set of membranes, displaying the image of a fearsome creature, and which allows the deployed apparatus to be used as an offensive or defensive pike should a predator charge a user of the apparatus.

In the most preferred embodiments, the present invention relates to an apparatus for deterring predators, which comprises a hollow tube with a plurality of openings at the top and an end cap, a sliding actuating collar on the exterior of the hollow tube that may be held in place by latching mechanisms at the top and bottom of the hollow tube, an internally housed sliding insert that attaches to the sliding actuating collar with cables and comprises a sharpened vertical support rod and two horizontal support rods, and deployable internally housed sheets that display a large image of a fearsome creature and are attached to the support rods of the sliding insert. The apparatus of the most preferred embodiment is configured before deployment to appear an ordinary walking stick with the insert stored at the bottom of the hollow tube, the internally housed sheets folded and rolled in a compact manner so as to fit inside the hollow tube, and the sliding actuating collar positioned at the top of the tube and fixed in place by the top latching mechanism. A user may deter a predator by deploying the sheets with the large image of the fearsome creature by disengaging the top latching mechanism and sliding the collar down the exterior of the hollow tube, thus bringing the internally housed sliding insert out of the top of the hollow tube, extending the sharpened vertical support rod above the hollow tube, allowing the horizontal support rods to drop to a perpendicular position relative to the hollow tube and unfurl the sheet side panels, and exposing the sheets with the fearsome creature image by tautly supporting the sheets between the support rods. The apparatus of the most preferred embodiment also allows the user to use the deployed walking stick as an offensive or defensive pike.

BRIEF DESCRIPTION OF THE DRAWING

Illustrative and preferred embodiments of the present invention are shown in the accompanying drawings in which.

DETAILED DESCRIPTION OF THE PREFERRED EMBODIMENTS

For the purpose of illustration, the present invention is shown in the most preferred embodiment of an apparatus for deterring predators comprising a walking stick; which comprises a hollow tube with a sliding actuating collar on its exterior that controls an internally housed sliding insert with a sharpened vertical support rod and two horizontal support rods and deployable internally housed sheets that display a large image of a fearsome creature and are attached to the support rods of the sliding insert; which is configured before deployment to appear and function as an ordinary walking stick with the insert and support rods stored in the hollow tube and with the sheets folded and rolled in a compact manner so as to fit inside the hollow tube with the insert; which deters a predator when a user deploys the sheets with the large image of the fearsome creature by sliding the actuating collar down the exterior of the hollow tube, thus bringing the internally housed sliding insert out of the top of the hollow tube, extending the sharpened vertical support rod and the horizontal support rods in order to expose the sheets with the fearsome creature image by tautly supporting the sheets between the support rods; and which allows the user to use the deployed walking stick as an offensive or defensive pike. This embodiment is not intended to limit the scope of the present invention.

Figure 1:
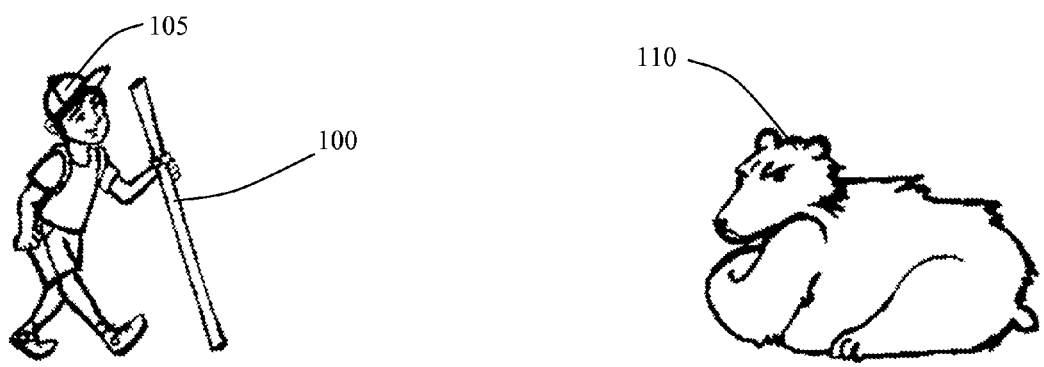
FIG. 1 is a side perspective view of a user holding the present invention in its concealed configuration and approaching a bear.
Figure 2:
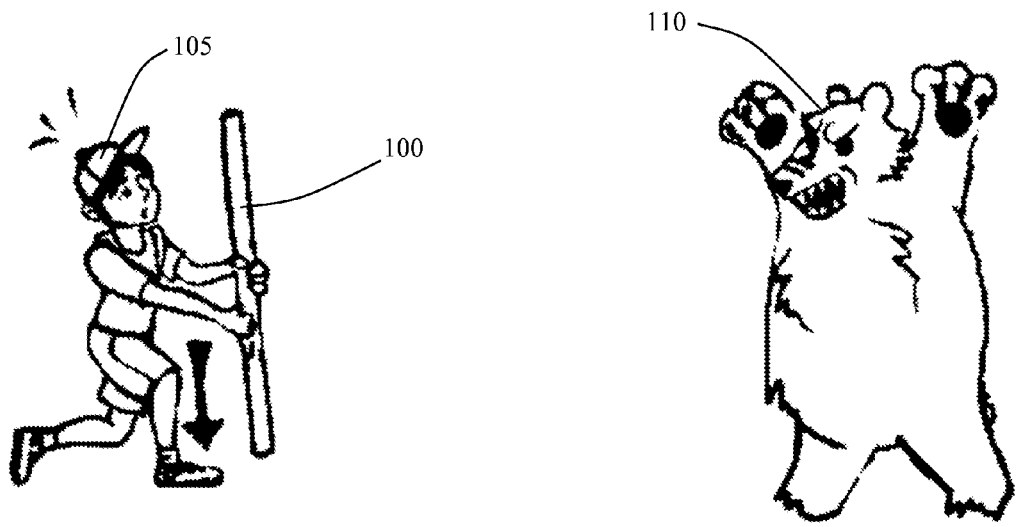
FIG. 2 is a side perspective view of a user beginning to deploy an apparatus of FIG. 1 and an angry bear.
Figure 3:
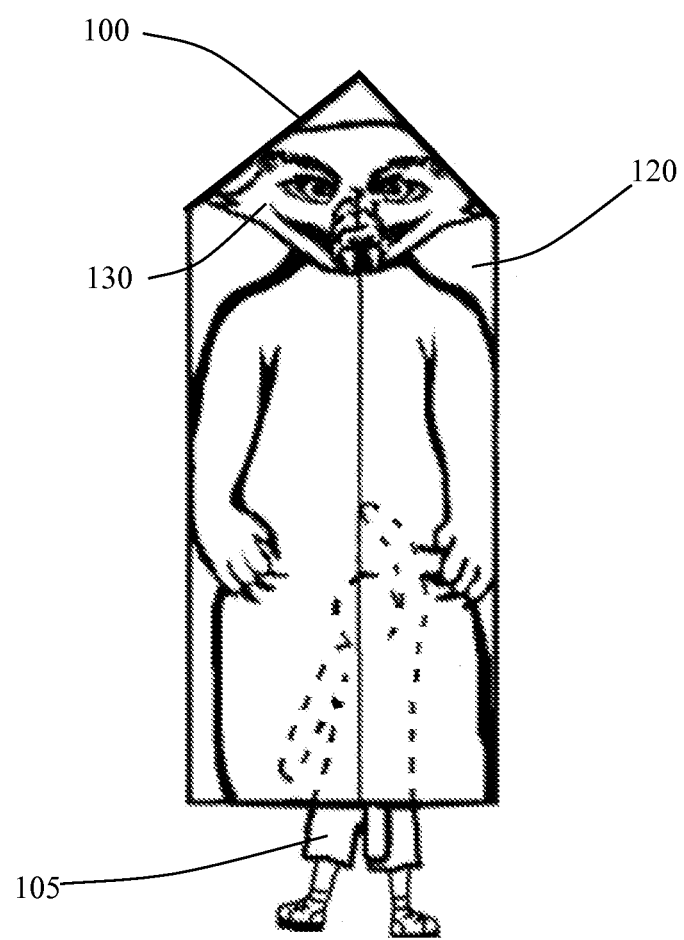
FIG. 3 is a front perspective view of a user holding aloft an apparatus of FIG. 1 in its deployed configuration.
Figure 4:
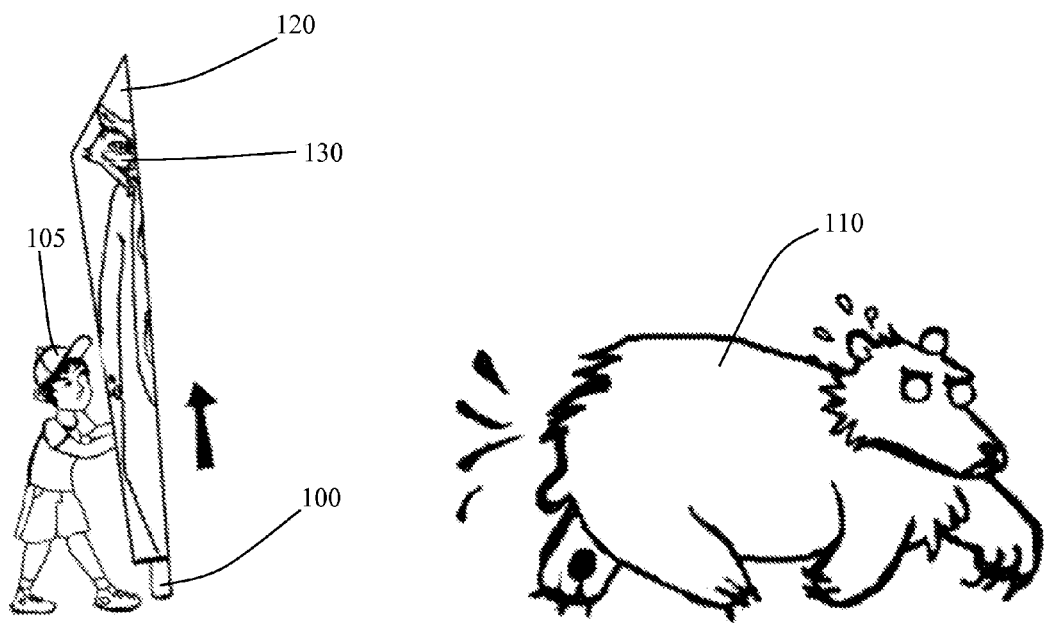
FIG. 4 is a side perspective view of a user holding an apparatus of FIG. 1 in its deployed configuration and a retreating bear.
Figure 5:
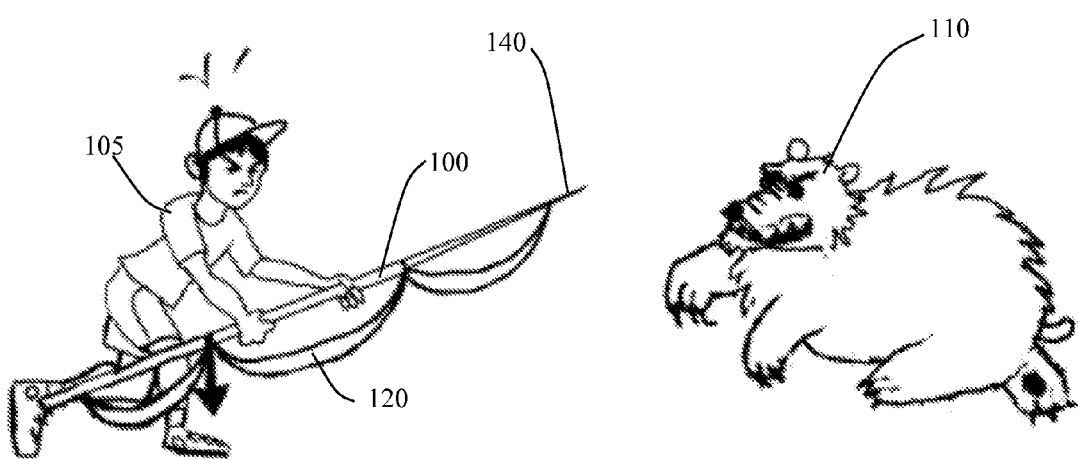
FIG. 5 is a side perspective view of a user using an apparatus of FIG. 1 as a pike and a charging bear.
Figure 6:
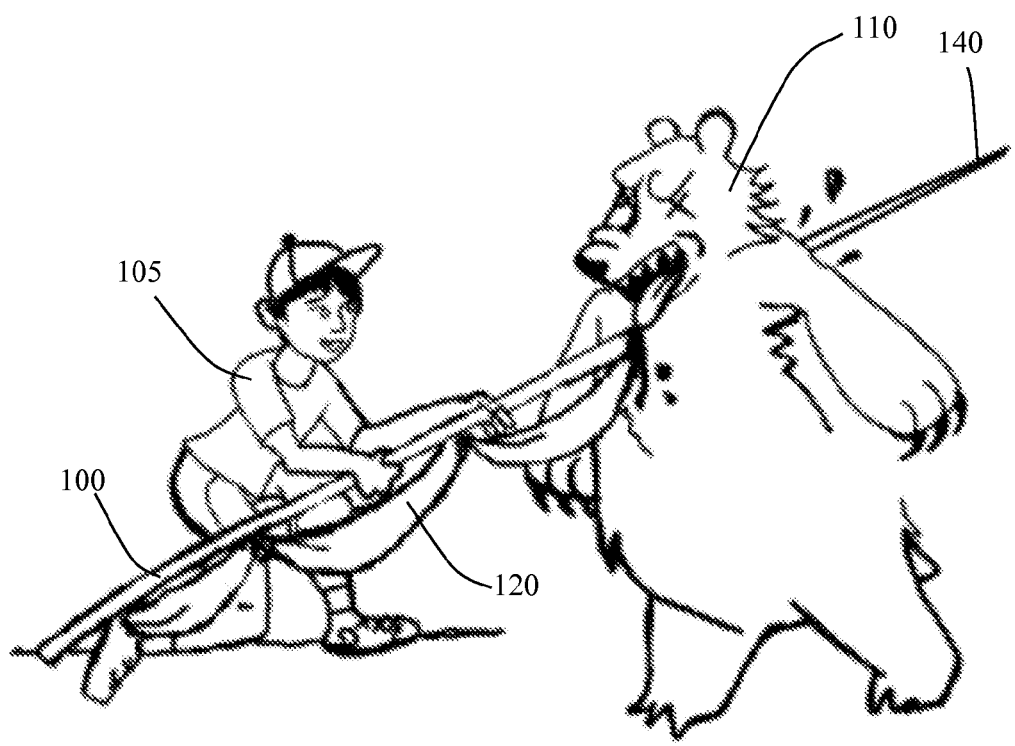
FIG. 6 is a side perspective view of a user using an apparatus of FIG. 1 as a pike to impale the charging bear of FIG. 5.
Figure 7:
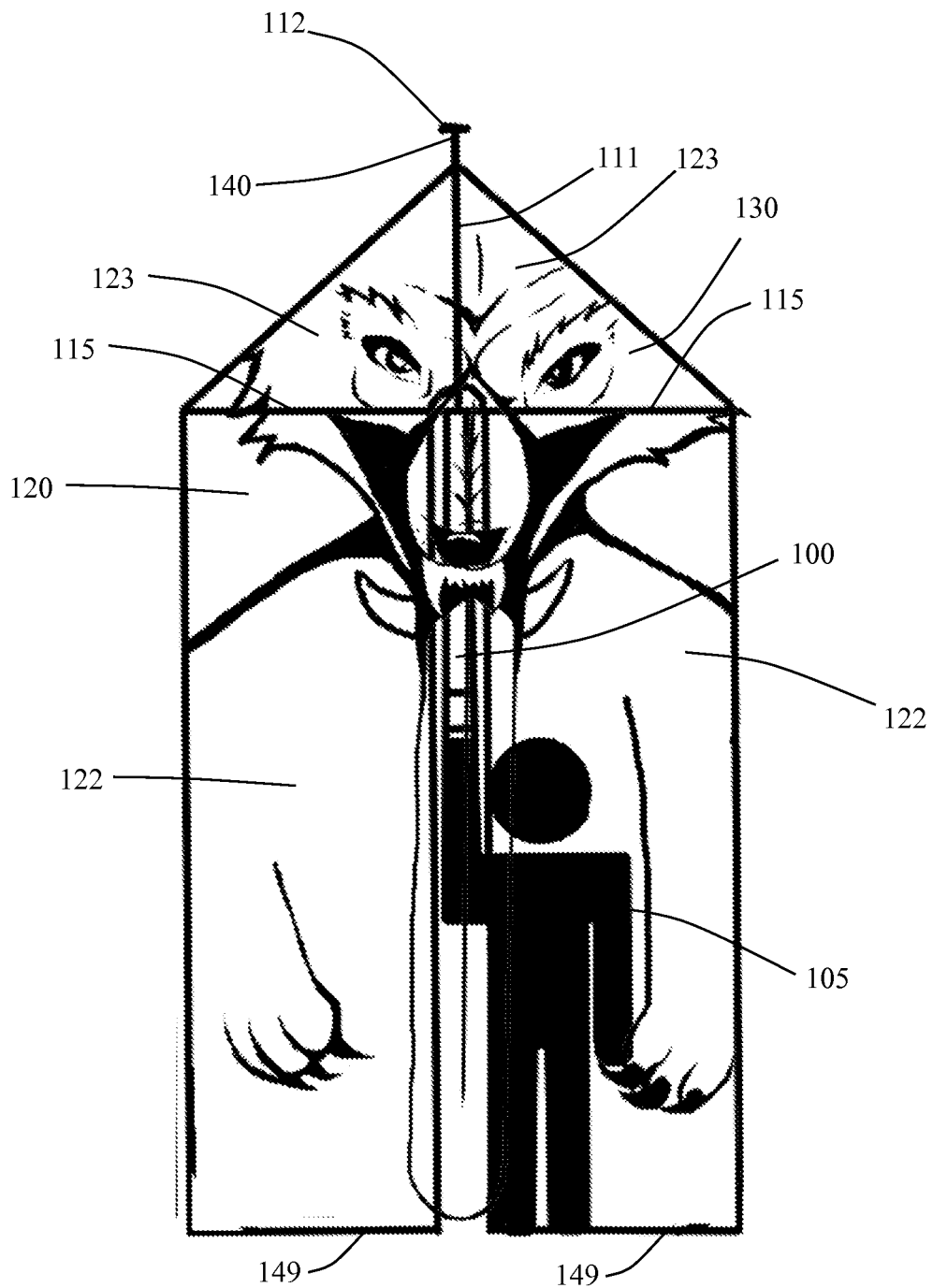
FIG. 7 is a front view of a silhouette of a user holding an apparatus of FIG. 1 in its deployed configuration showing details of the image displayed by the apparatus.
Figure 8:
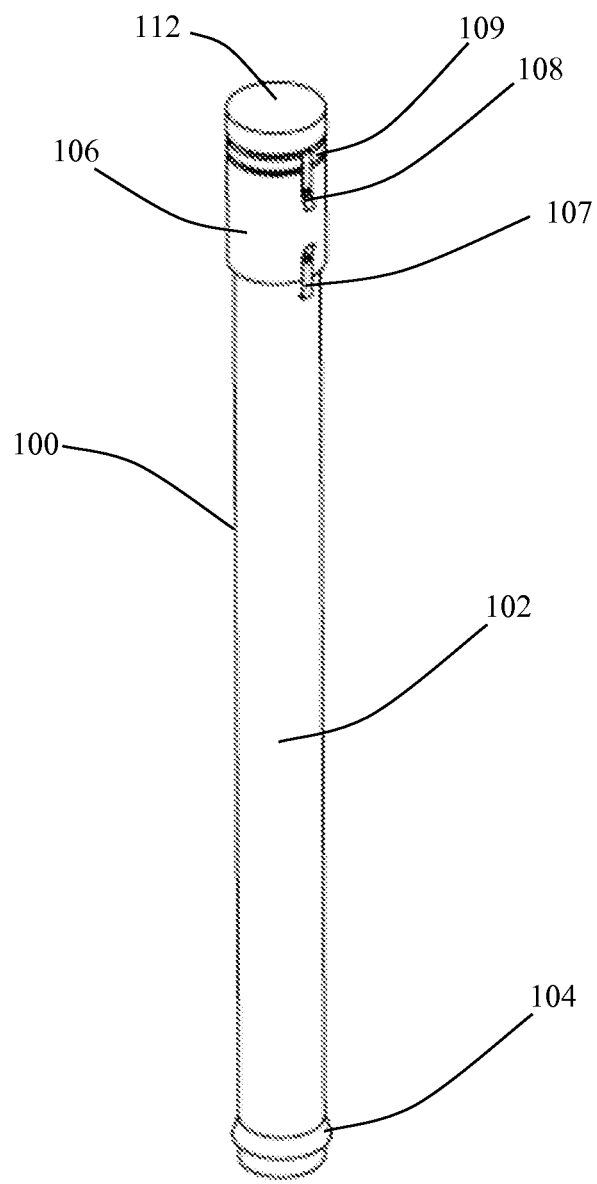
FIG. 8 is a front perspective view of an apparatus of the present invention in its concealed configuration.
Figure 9:
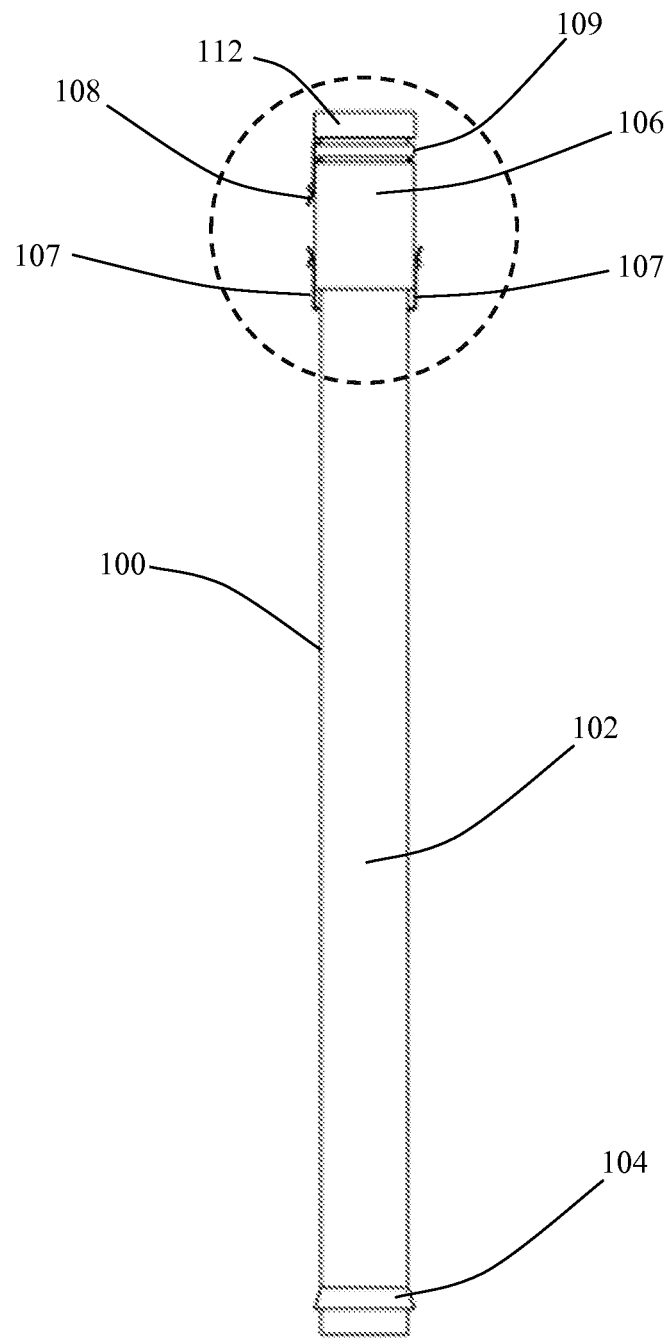
FIG. 9 is a front view of an apparatus of FIG. 8.
Figure 10:
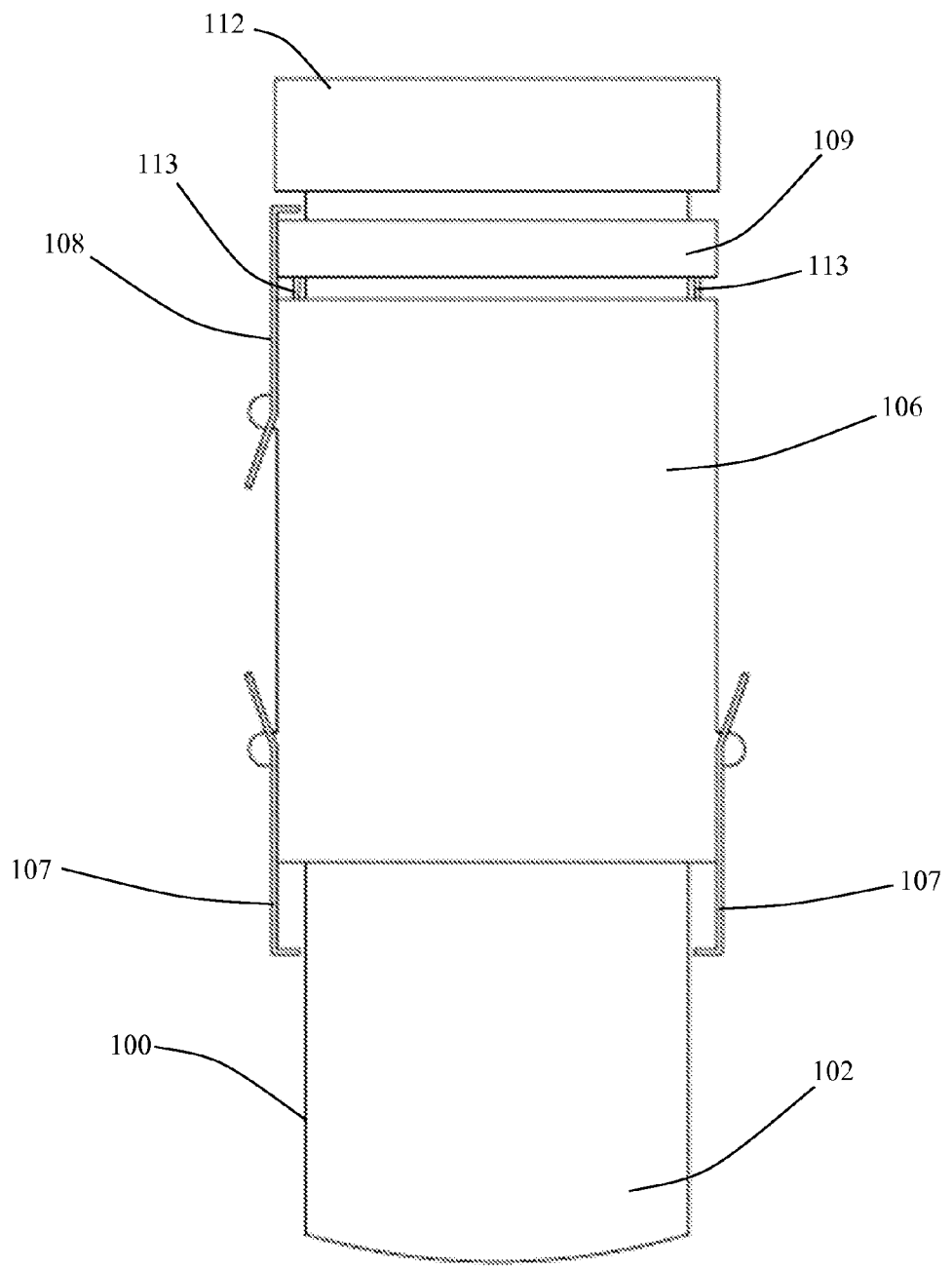
FIG. 10 is a front view of a close-up of an apparatus of FIG. 9.
Figure 11:
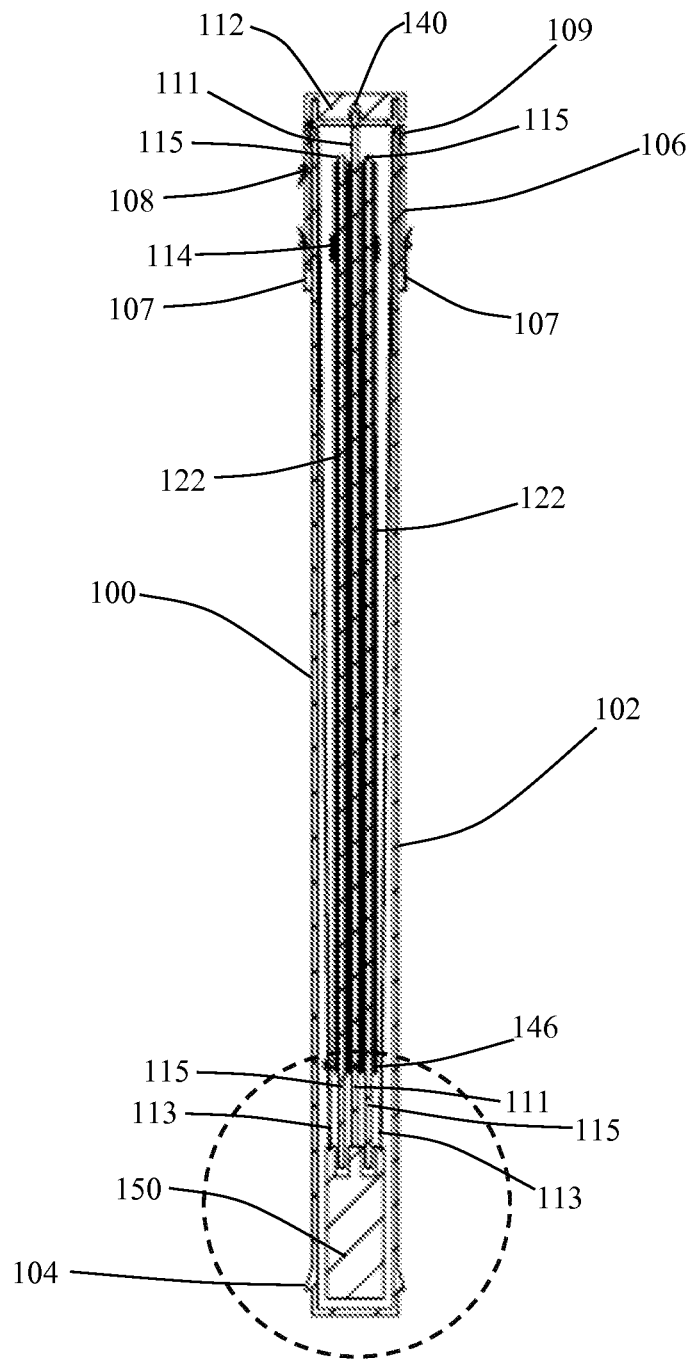
FIG. 11 is a sectional front view of an apparatus of FIG. 9.
Figure 12:
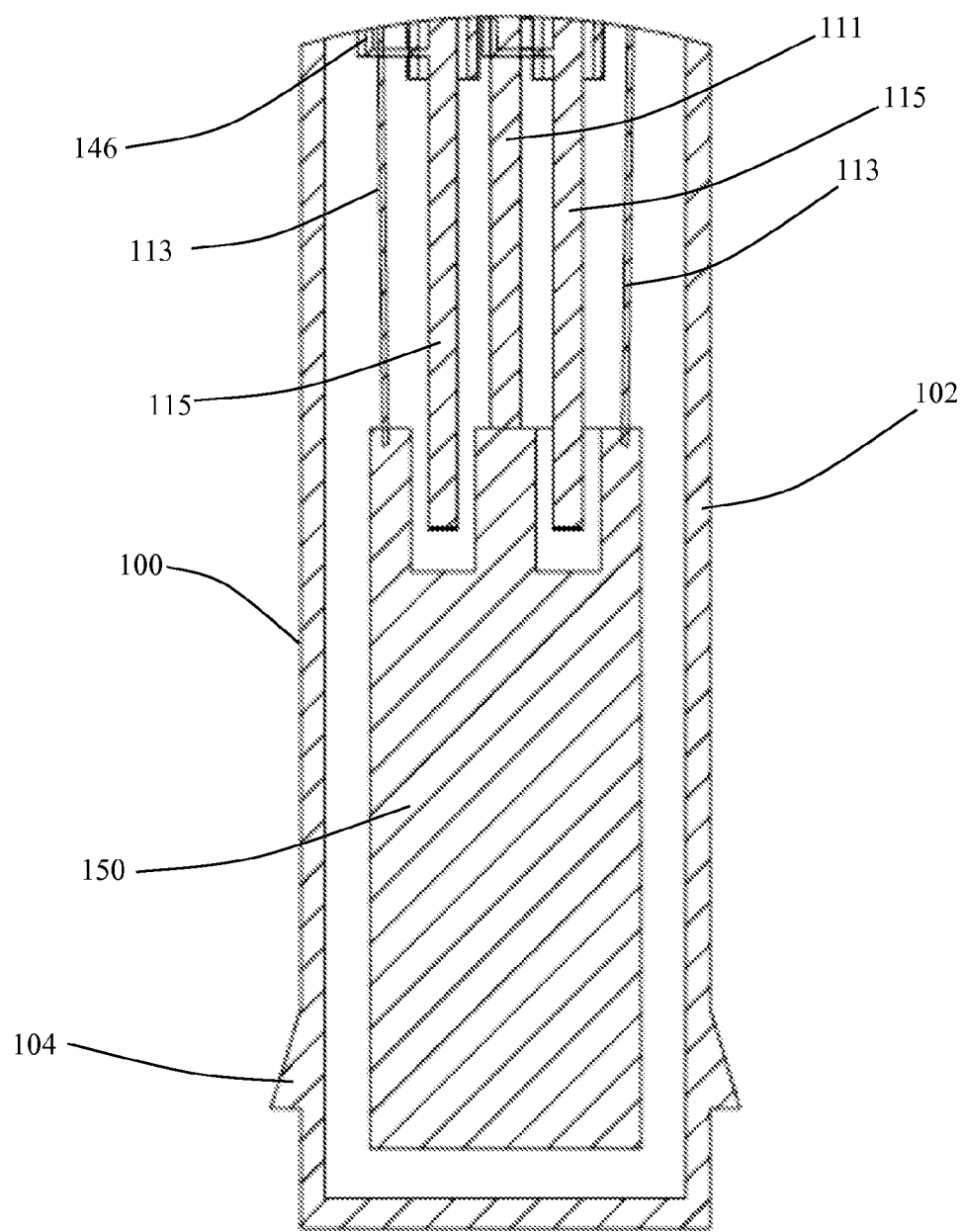
FIG. 12 is a sectional front view of a close-up of an apparatus of FIG. 11.
Figure 13:
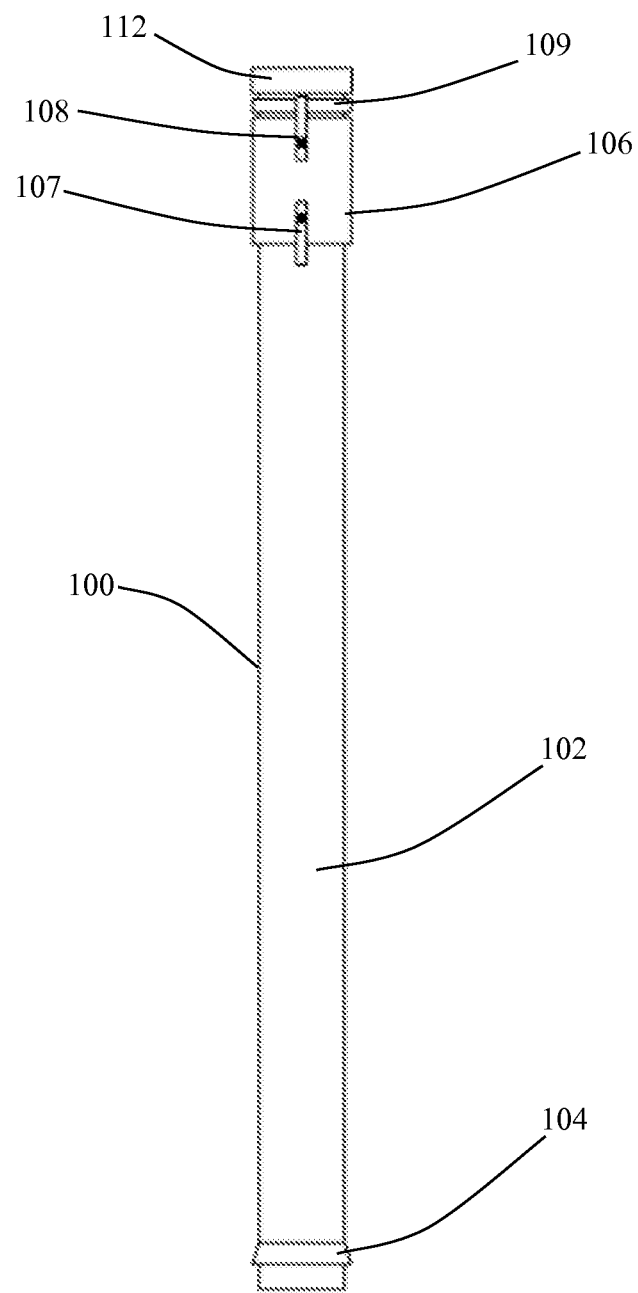
FIG. 13 is a side view of an apparatus of FIG. 8.
Figure 14:
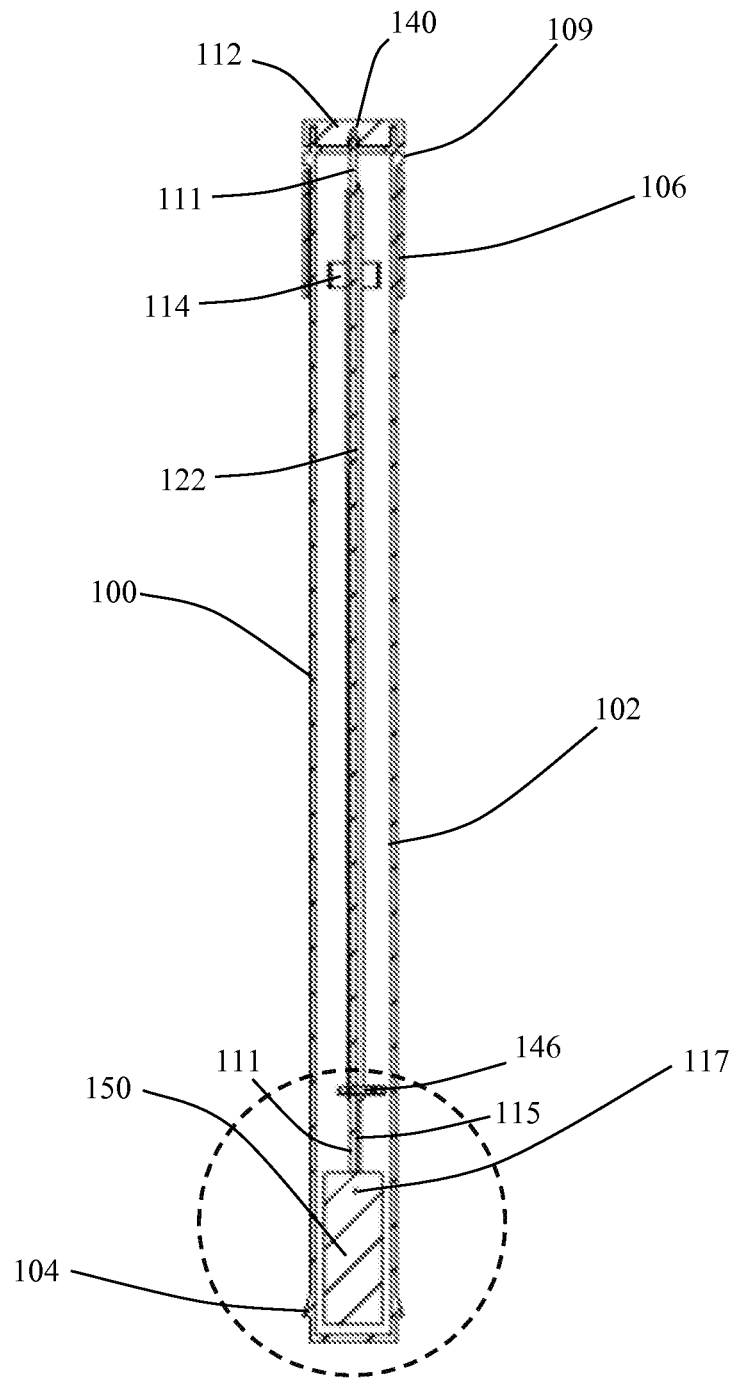
FIG. 14 is a sectional side view of an apparatus of FIG. 13.
Figure 15:
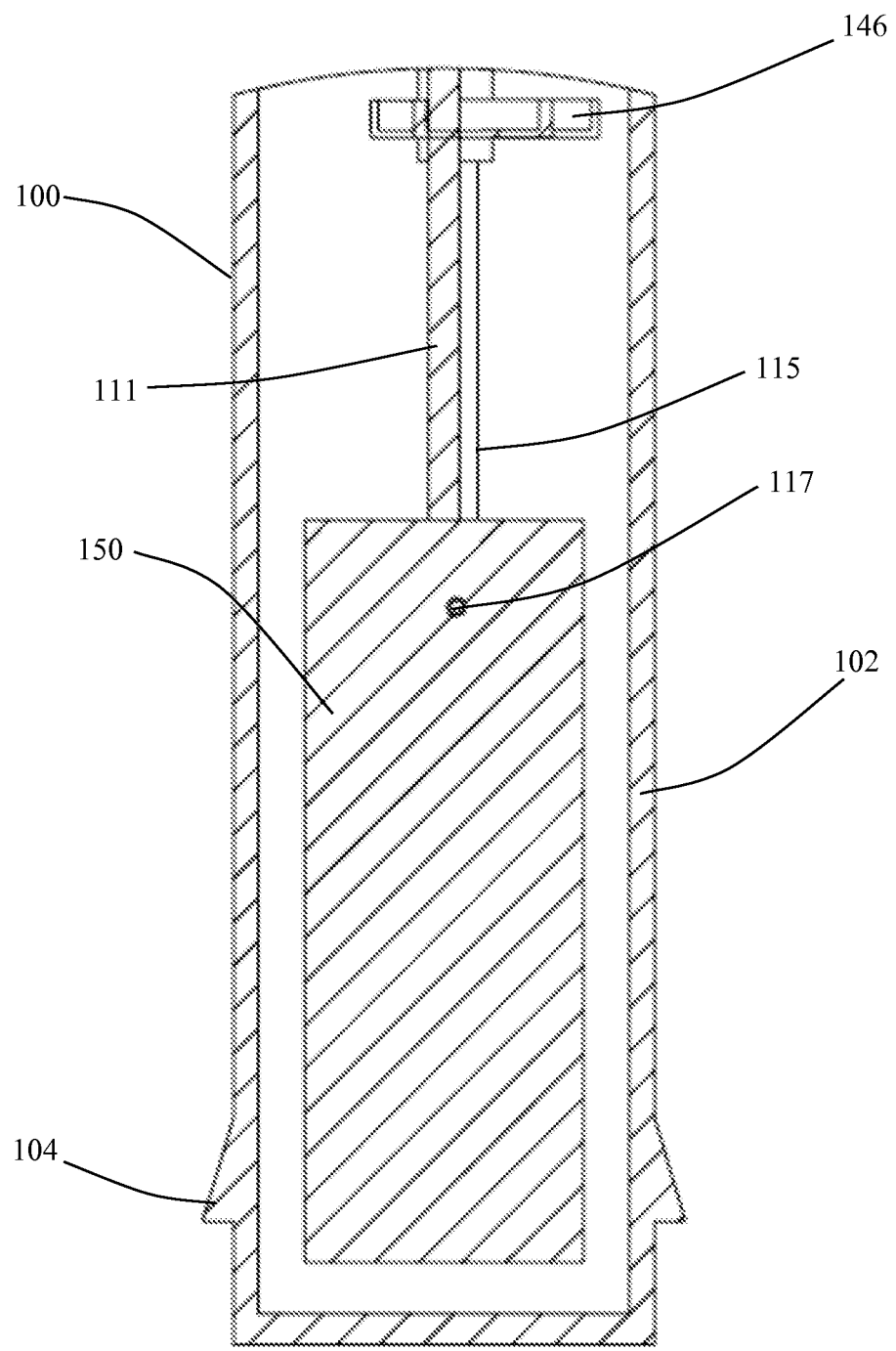
FIG. 15 is a sectional side view of a close-up of an apparatus of FIG. 14.
Figure 16:
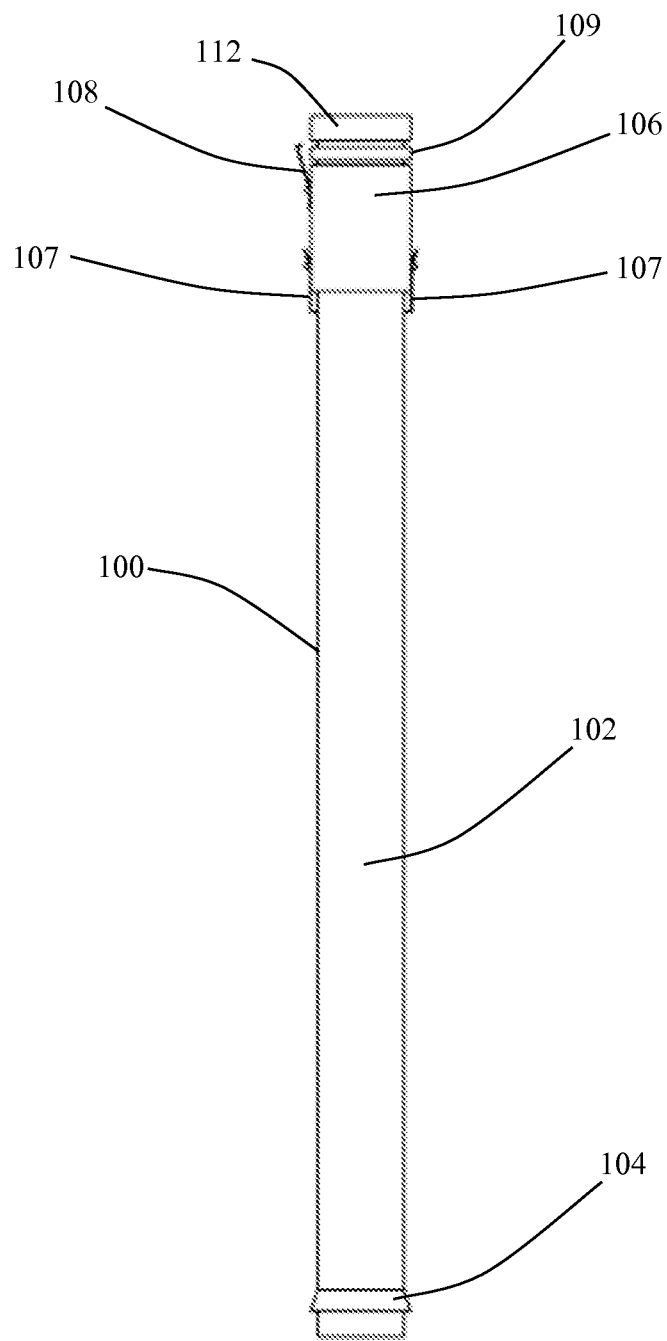
FIG. 16 is a front view of an apparatus of FIG. 8 in the process of being deployed.
Figure 17:
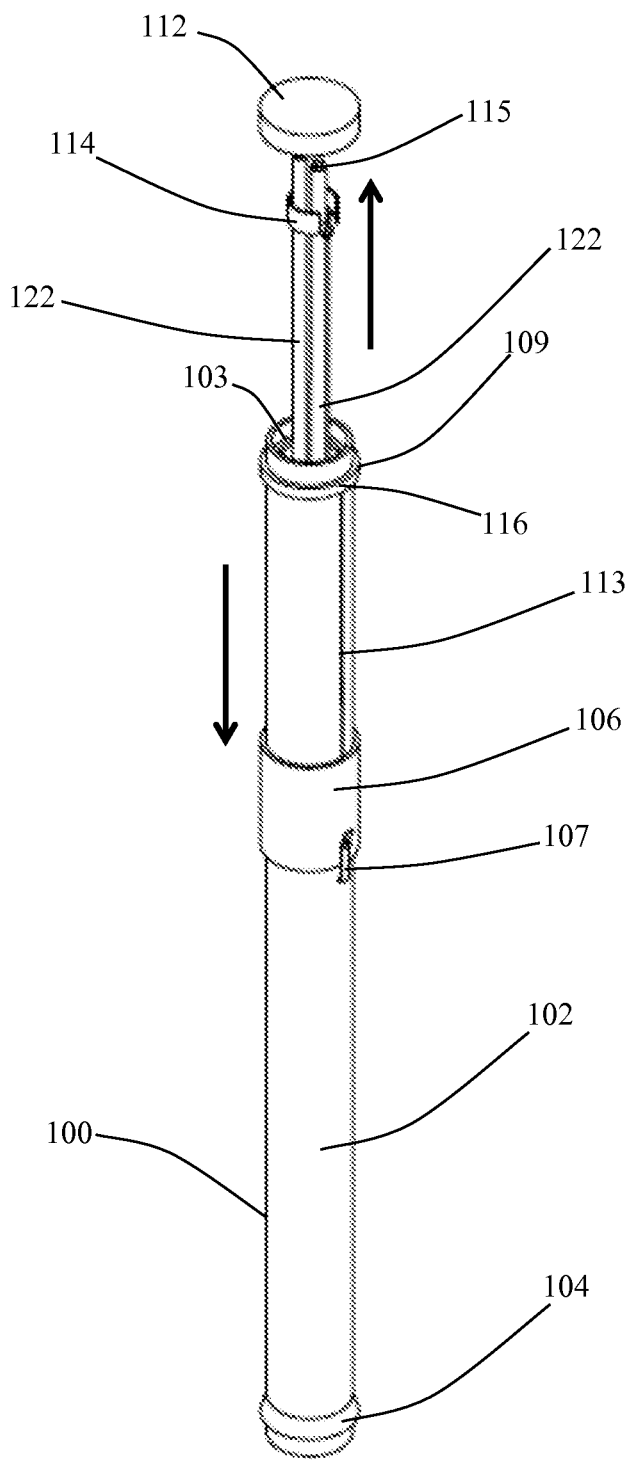
FIG. 17 is a perspective view of an apparatus of FIG. 8 in the process of being deployed.
Figure 18:
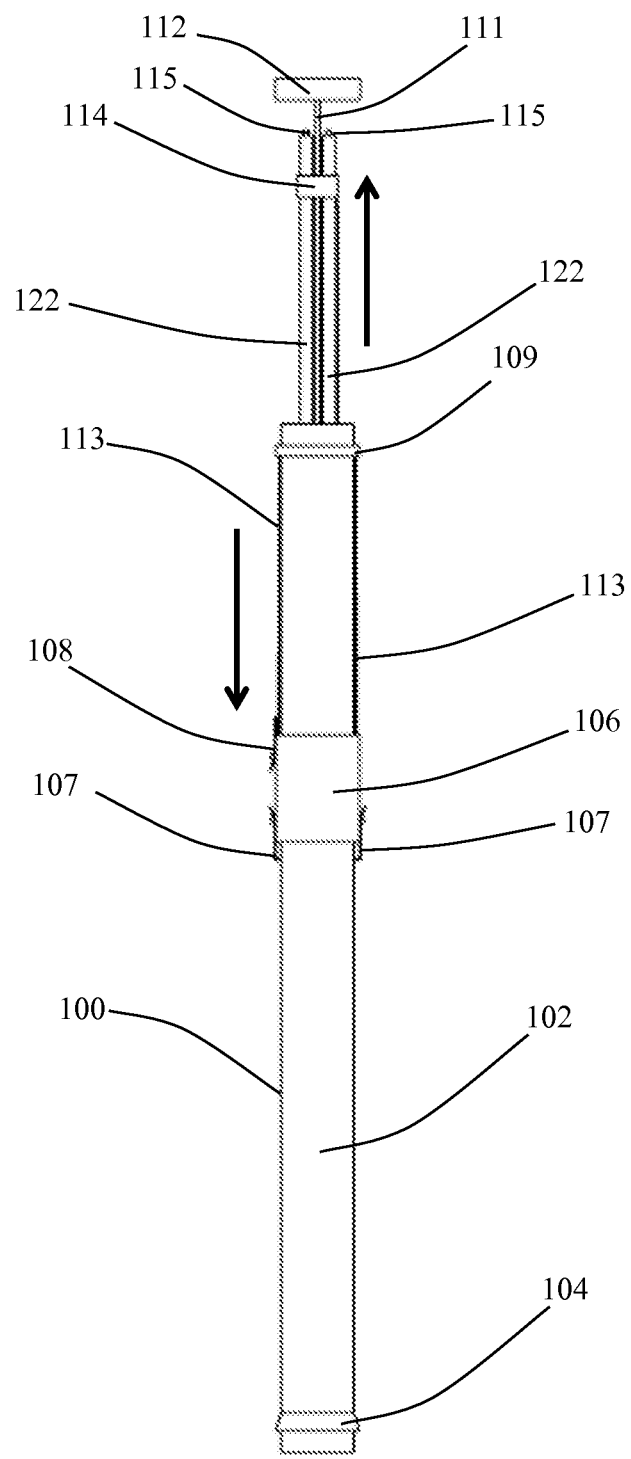
FIG. 18 is a front view of an apparatus of FIG. 17.
Figure 19:
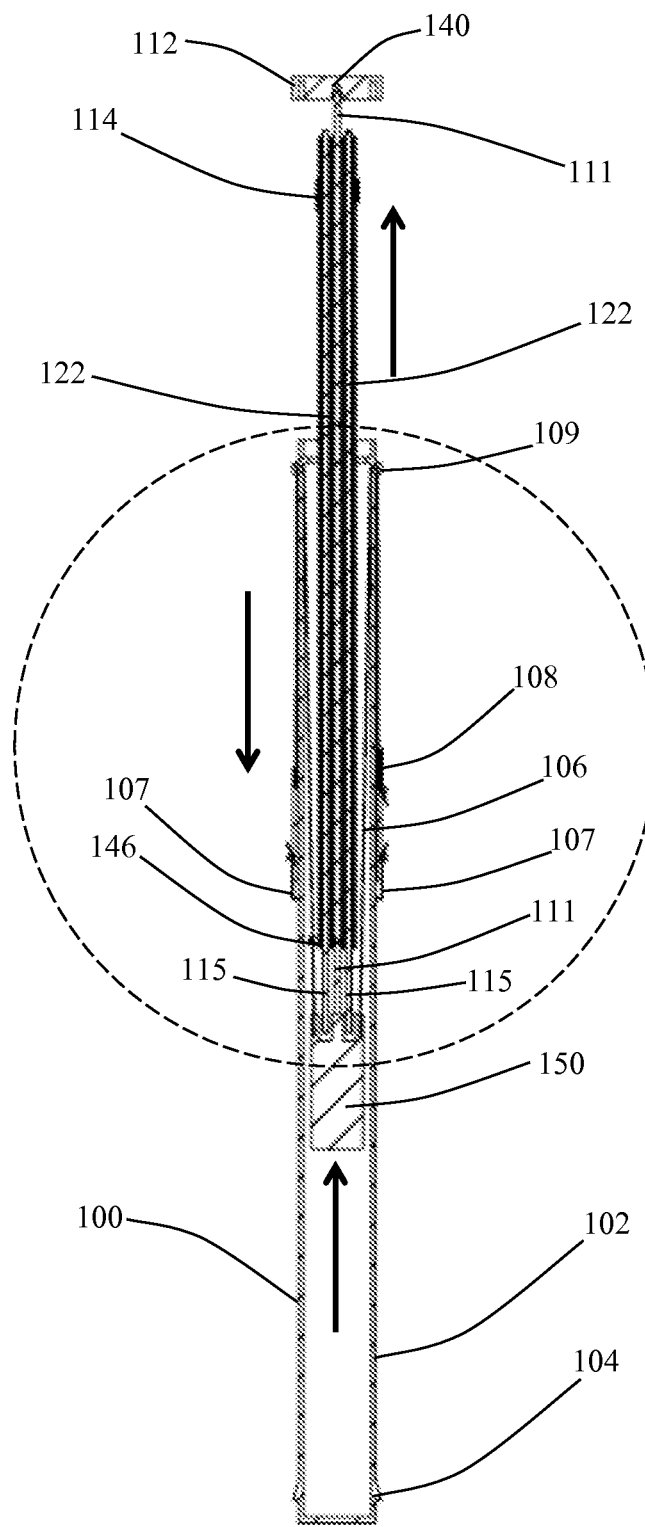
FIG. 19 is a sectional front view of an apparatus of FIG. 18.
Figure 20:
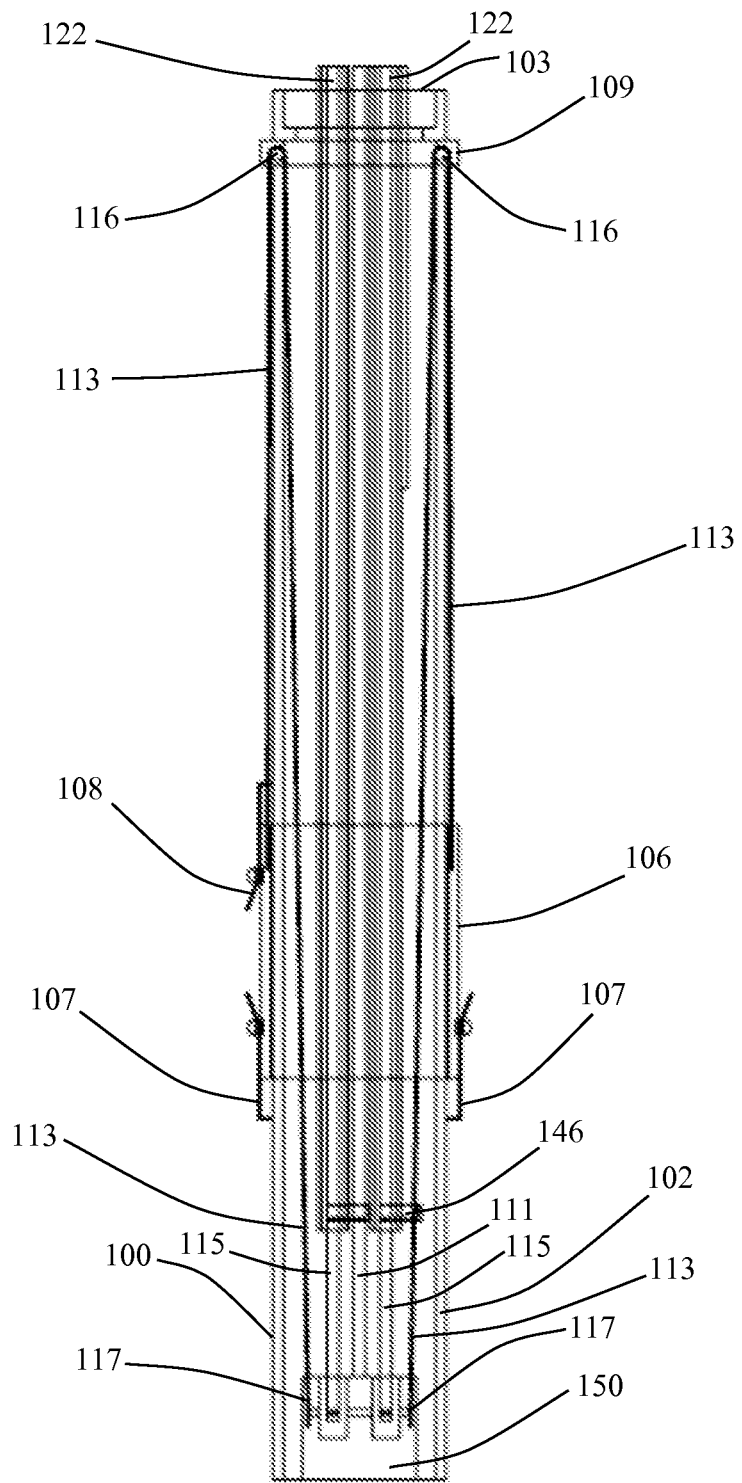
FIG. 20 is a sectional side view of a close-up of an apparatus of FIG. 19.
Figure 21:
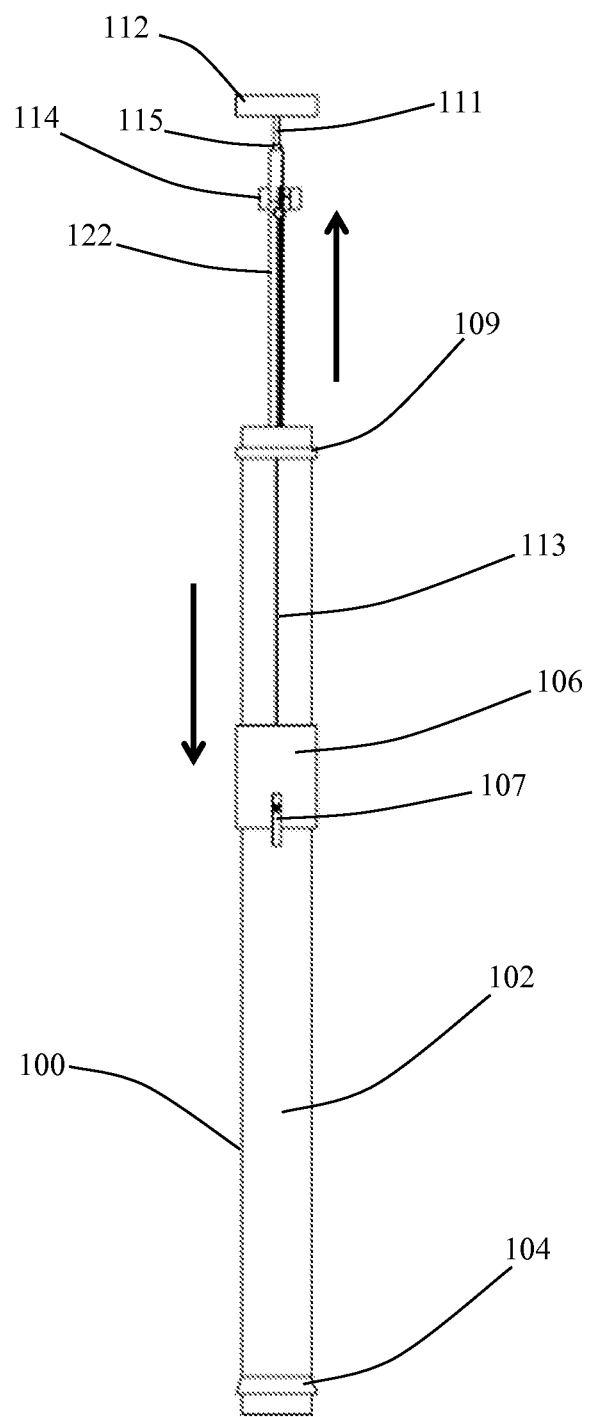
FIG. 21 is a side view of an apparatus of FIG. 17.
Figure 22:
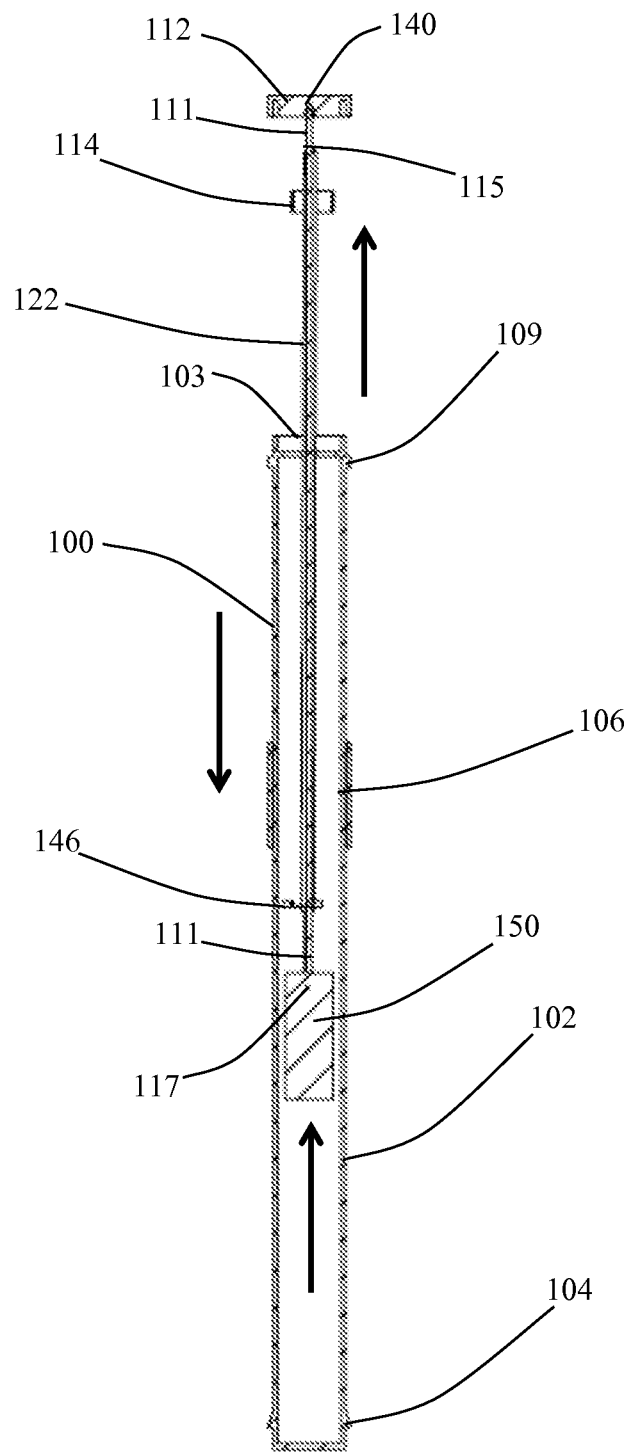
FIG. 22 is a sectional side view of an apparatus of FIG. 21.
Figure 23:
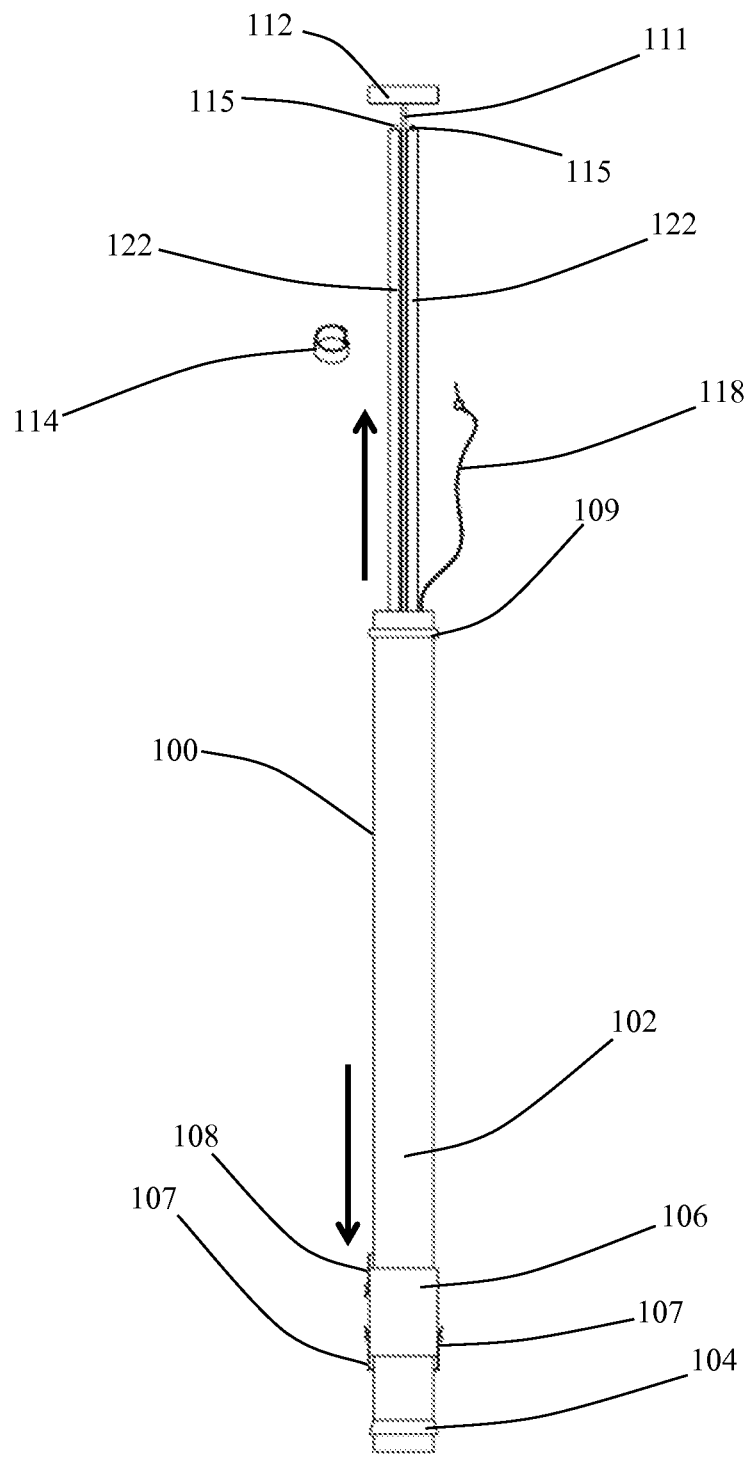
FIG. 23 is a front view of an apparatus of FIG. 8 in the process of being deployed.
Figure 24:
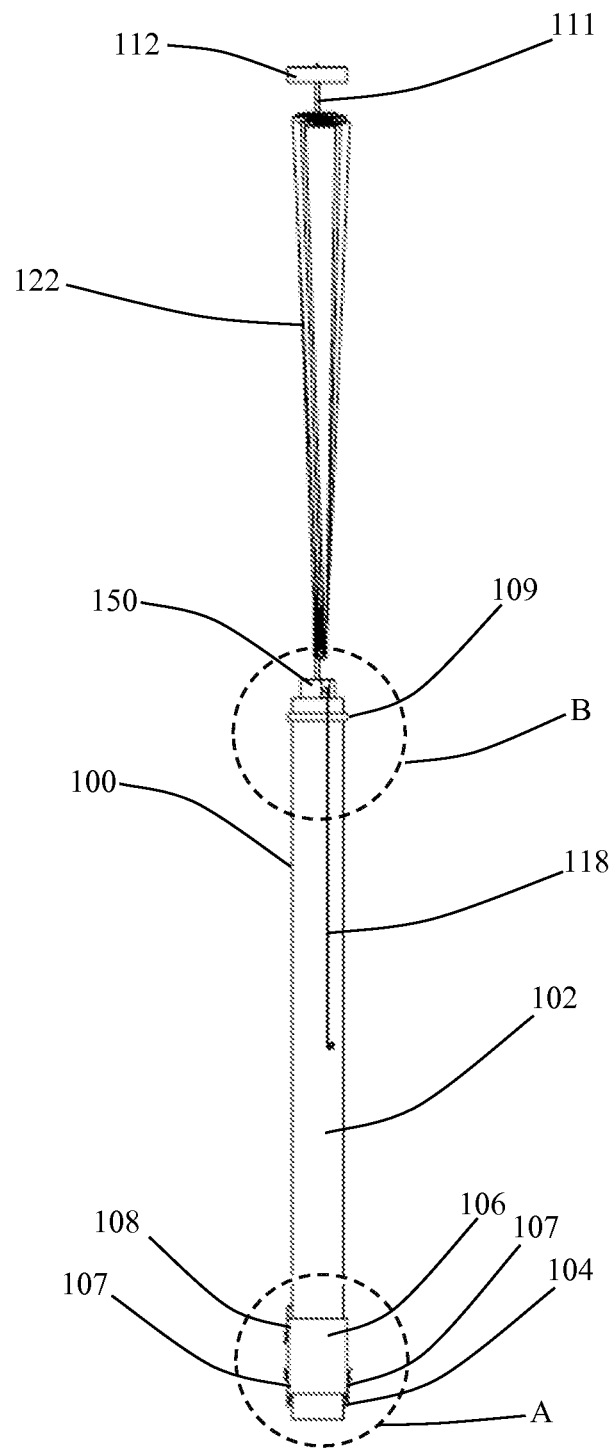
FIG. 24 is a front view of an apparatus of FIG. 8 in the process of being deployed.
Figure 25:
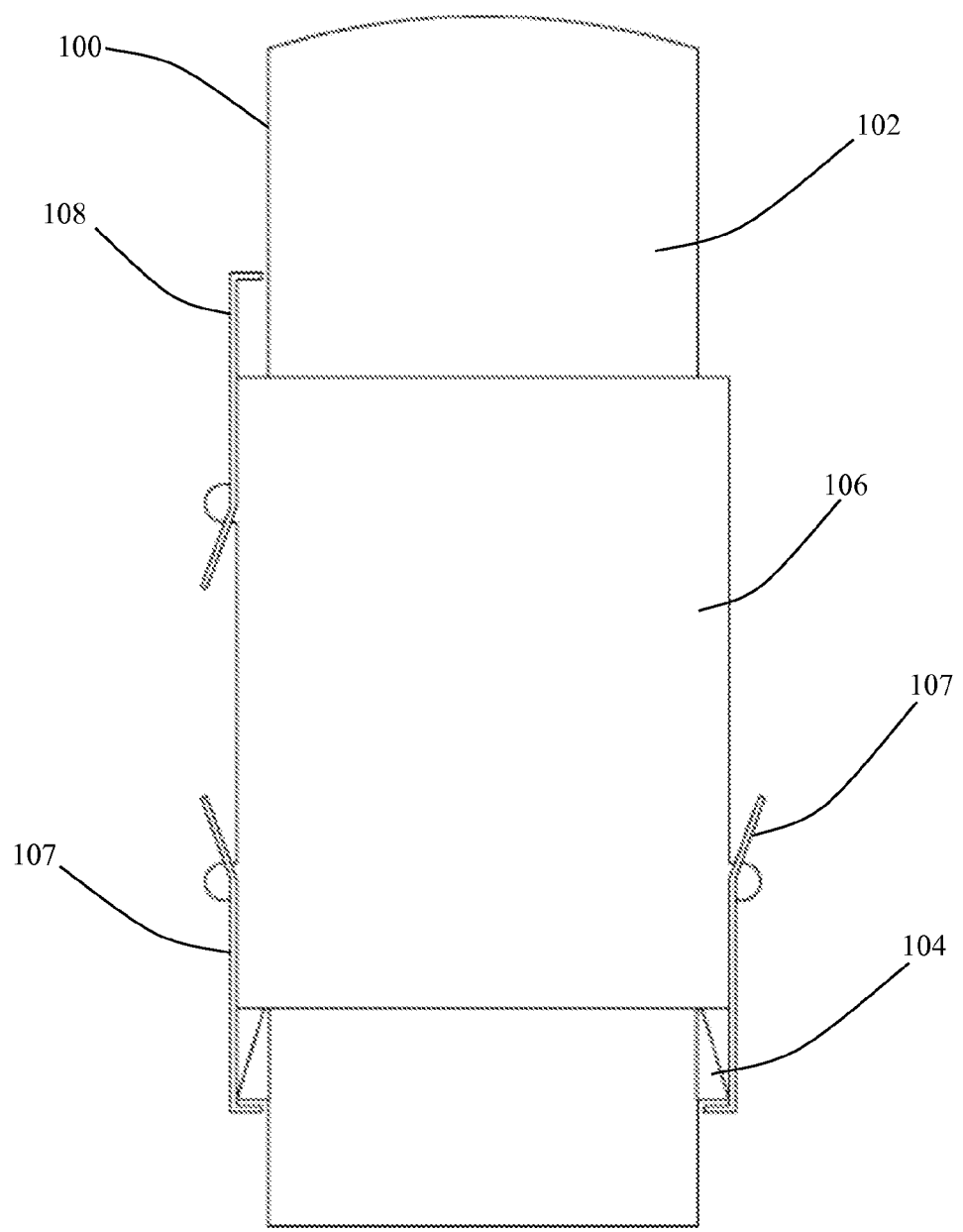
FIG. 25 is a front view of a close-up of detail A of an apparatus of FIG. 24.
Figure 26:
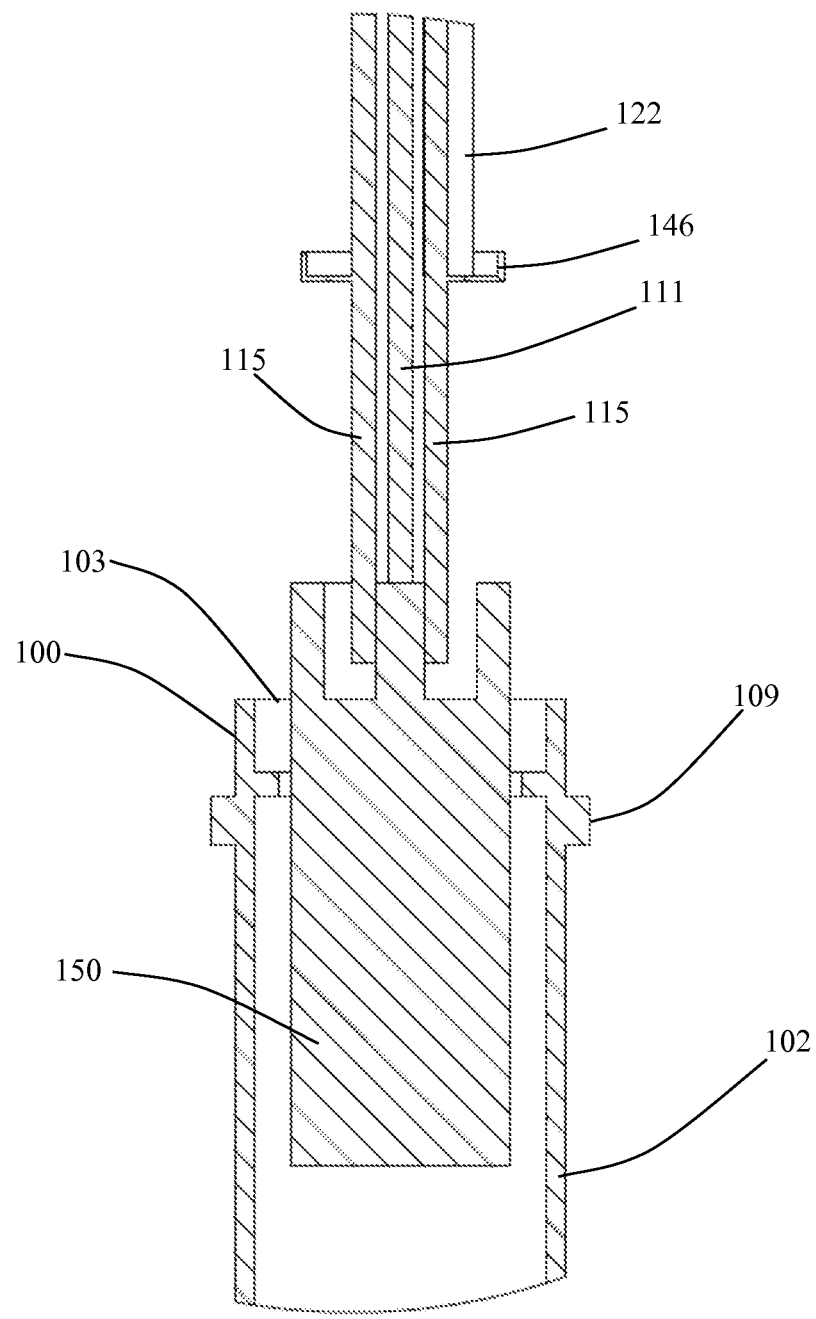
FIG. 26 is a sectional front view of a close-up of detail B of an apparatus of FIG. 24.
Figure 27:
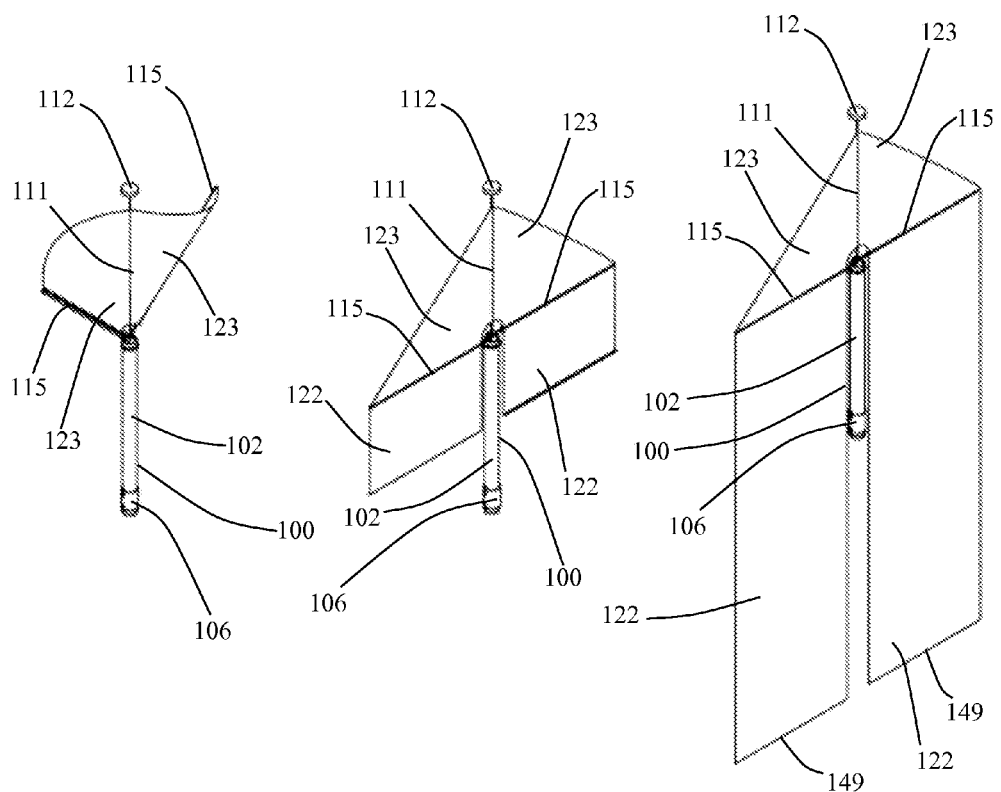
FIG. 27 is perspective views of an apparatus of FIG. 8 showing the sequence of deployment.
Figure 28:
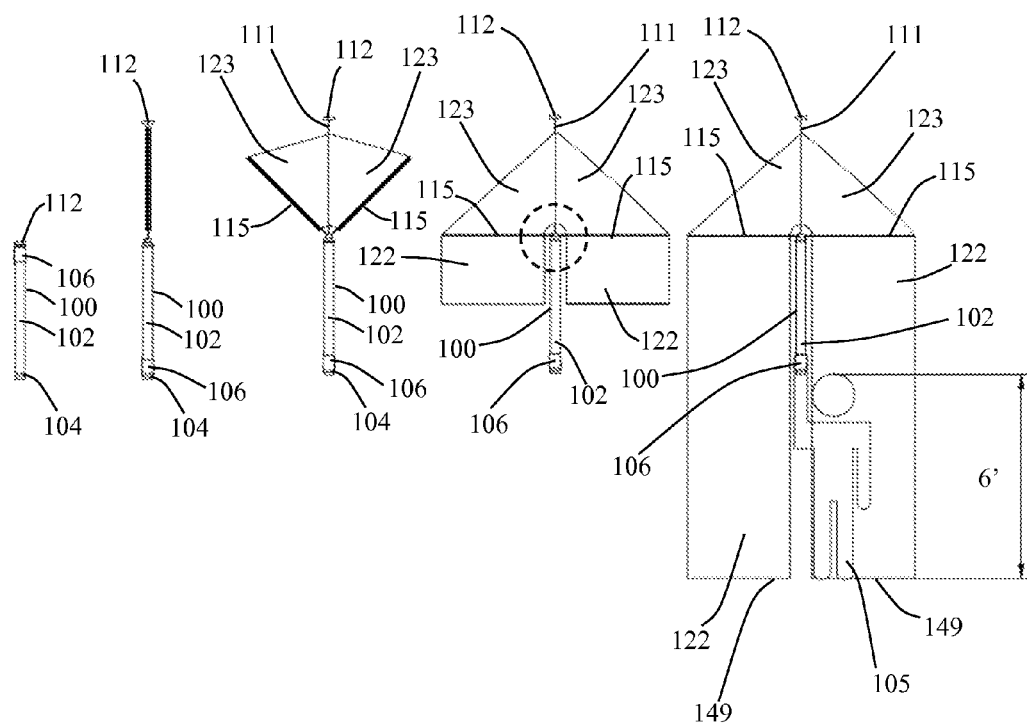
FIG. 28 is front views of an apparatus of FIG. 8 showing the sequence of deployment and showing the deployed configuration held aloft by a user.
Figure 29:
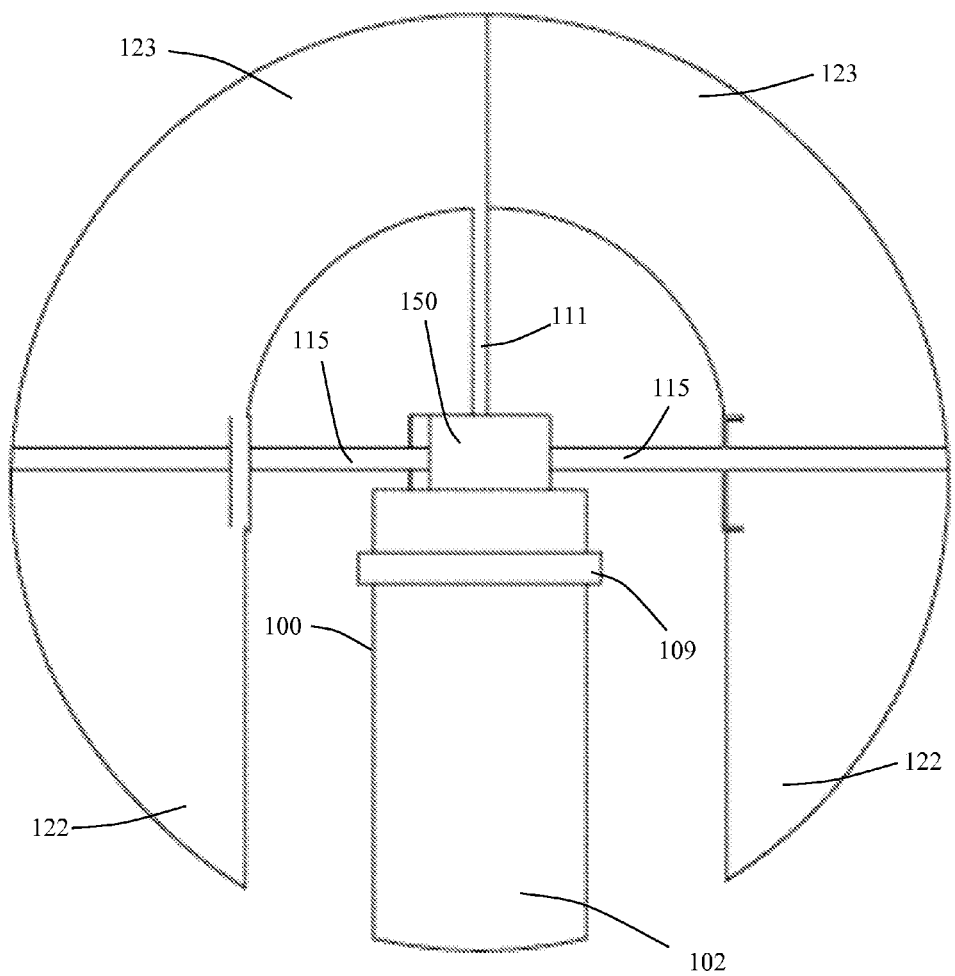
FIG. 29 is a front view of a close-up of an apparatus of FIG. 28.
Figure 30:
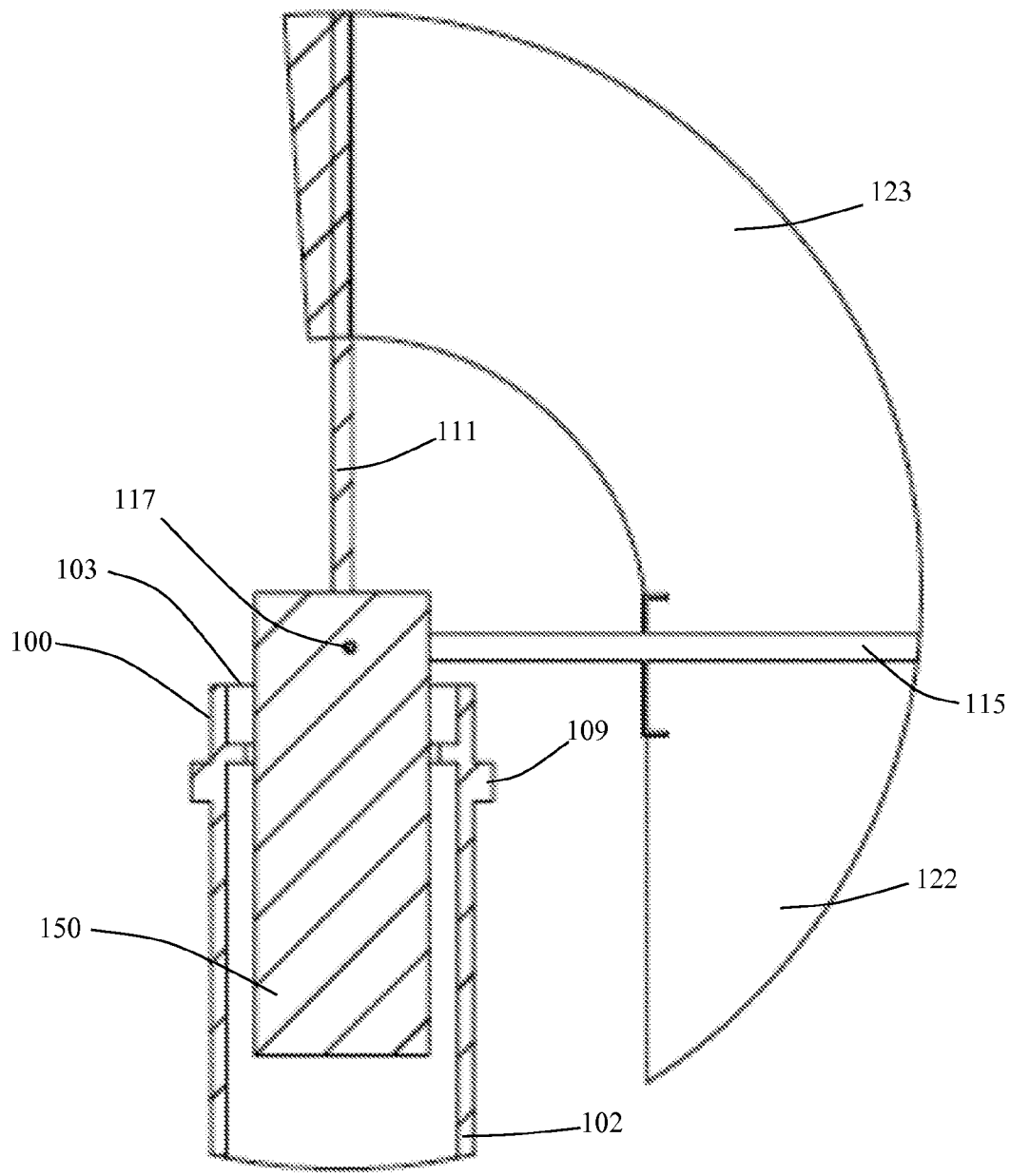
FIG. 30 is a sectional front view of a close-up of an apparatus of FIG. 29.
Figure 31:
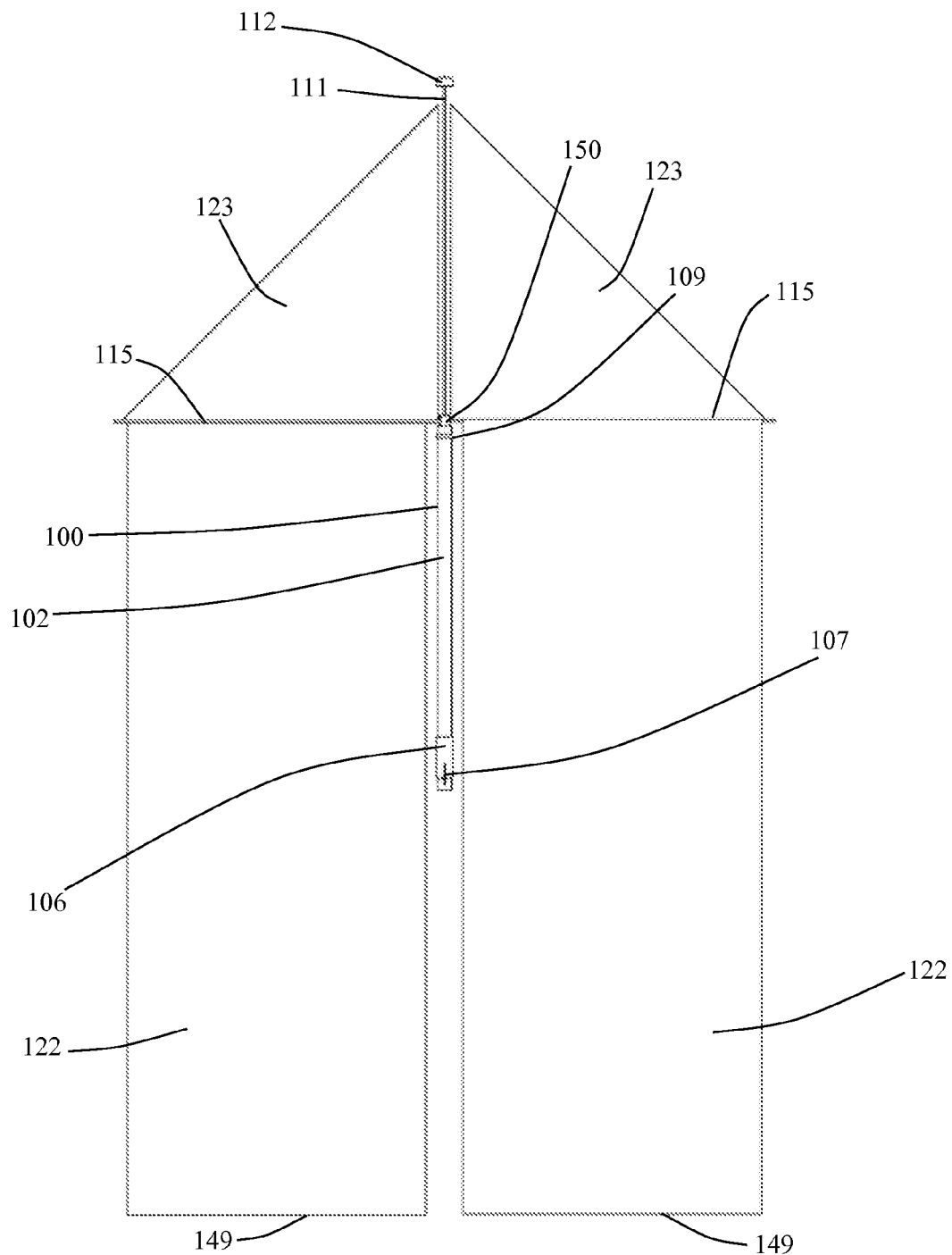
FIG. 31 is a front view of an apparatus of FIG. 8 in a deployed configuration.
Figure 32:
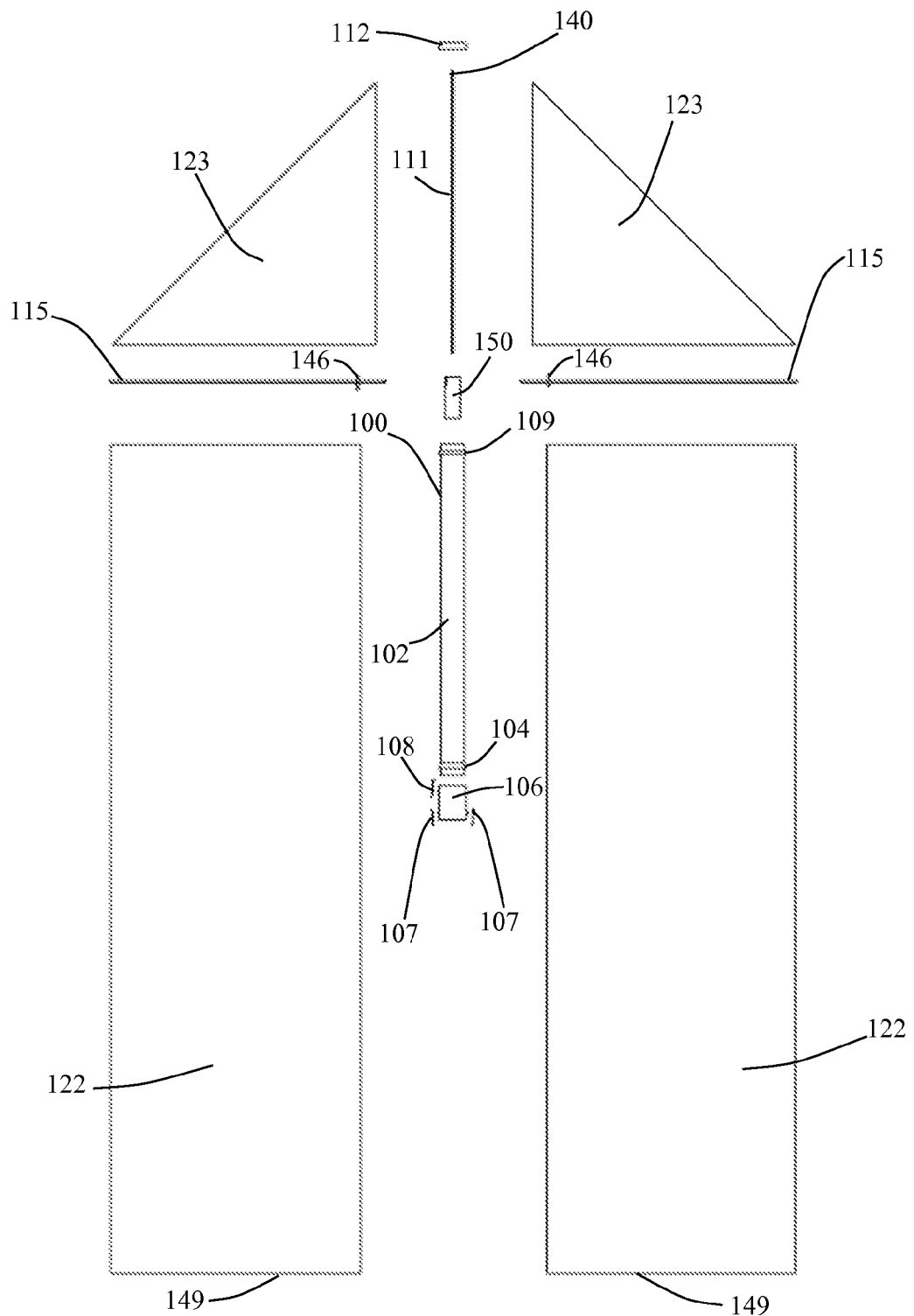
FIG. 32 is an exploded front view of an apparatus of FIG. 31.

Referring now to the most preferred embodiment of the invention, in FIG. 1, FIG. 2, FIG. 3, FIG. 4, FIG. 5, FIG. 6, FIG. 7, FIG. 8, FIG. 9, FIG. 10, FIG. 11, FIG. 12, FIG. 13, FIG. 14, FIG. 15, FIG. 16, FIG. 17, FIG. 18, FIG. 19, FIG. 20, FIG. 21, FIG. 22, FIG. 23, FIG. 24, FIG. 25, FIG. 26, FIG. 27, FIG. 28, FIG. 29, FIG. 30, FIG. 31 and FIG. 32, a Predator-Deterring Walking Stick 100 is shown. FIG. 1 illustrates a side perspective view of a hiking user 105 holding a Predator-Deterring Walking Stick 100 in its concealed configuration, which appears as an ordinary walking stick, and approaching a bear 110. FIG. 2 depicts a side perspective view of a user 105 beginning to deploy a Predator-Deterring Walking Stick 100 and an angry bear 110. FIG. 3 shows a front perspective view of a user 105 holding aloft a Predator-Deterring Walking Stick 100 in its deployed configuration, thereby displaying a fearsome creature image 130. FIG. 4 displays a side perspective view of a user 105 holding a Predator-Deterring Walking Stick 100 in its deployed configuration, thereby displaying a fearsome creature image 130, and a retreating bear 110, which has been deterred by the displayed fearsome creature image 130. FIG. 5 shows a side perspective view of a user 105 using a Predator-Deterring Walking Stick 100 as a pike and a charging bear 110. FIG. 6 depicts a side perspective view of a user 105 using a Predator-Deterring Walking Stick 100 as a pike to impale the charging bear 110 of FIG. 5. FIG. 7 illustrates a front view of a silhouette of a user 105 holding a Predator-Deterring Walking Stick 100 in its deployed configuration and showing details of the fearsome creature image 130 displayed by the apparatus. (For the purposes of illustration and to enhance the visibility of details in the drawing, in FIG. 8-32, the width of a Predator-Deterring Walking Stick 100 is exaggerated relative to its length.) FIG. 8 demonstrates a front perspective view of a Predator-Deterring Walking Stick 100. FIG. 9 shows a front view of a Predator-Deterring Walking Stick 100 of FIG. 8. FIG. 10 displays a front view of a close-up of the portion of a Predator-Deterring Walking Stick 100 indicated in the detail circle of FIG. 9. FIG. 11 depicts a sectional front view of a Predator-Deterring Walking Stick 100 of FIG. 9. FIG. 12 illustrates a sectional front view of a close-up of the portion of a Predator-Deterring Walking Stick 100 indicated in the detail circle of FIG. 11. FIG. 13 shows a side view of a Predator-Deterring Walking Stick 100 of FIG. 8. FIG. 14 illustrates a sectional side view of a Predator-Deterring Walking Stick 100 of FIG. 13. FIG. 15 displays a sectional side view of a close-up of the portion of a Predator-Deterring Walking Stick 100 indicated in the detail circle of FIG. 14. FIG. 16 demonstrates a front view of a Predator-Deterring Walking Stick 100 of FIG. 8 in the process of being deployed. FIG. 17 shows a perspective view of a Predator-Deterring Walking Stick 100 of FIG. 8 in the process of being deployed. FIG. 18 depicts a front view of a Predator-Deterring Walking Stick 100 of FIG. 17. FIG. 19 illustrates a sectional front view of a Predator-Deterring Walking Stick 100 of FIG. 18. FIG. 20 displays a sectional side view of a close-up of the portion of a Predator-Deterring Walking Stick 100 indicated in the detail circle of FIG. 19. FIG. 21 demonstrates a side view of a Predator-Deterring Walking Stick 100 of FIG. 17. FIG. 22 shows a sectional side view of a Predator-Deterring Walking Stick 100 of FIG. 21. FIG. 23 illustrates a front view of a Predator-Deterring Walking Stick 100 of FIG. 8 in the process of being deployed. FIG. 24 shows a front view of a Predator-Deterring Walking Stick 100 of FIG. 8 in the process of being deployed. FIG. 25 depicts a front view of a close-up of the portion of a Predator-Deterring Walking Stick 100 indicated in detail circle A of FIG. 24. FIG. 26 illustrates a sectional front view of a close-up of the portion of a Predator-Deterring Walking Stick 100 indicated in detail circle B of FIG. 24. FIG. 27 shows perspective views of a Predator-Deterring Walking Stick 100 of FIG. 8 showing the sequence of deployment. FIG. 28 demonstrates front views of a Predator-Deterring Walking Stick 100 of FIG. 8 showing the sequence of deployment with the deployed configuration held aloft by a user 105. FIG. 29 illustrates a front view of a close-up of the portion of a Predator-Deterring Walking Stick 100 indicated in the detail circle of FIG. 28. FIG. 30 shows a sectional front view of a close-up of a Predator-Deterring Walking Stick 100 of FIG. 29. FIG. 31 depicts a front view of a Predator-Deterring Walking Stick 100 of FIG. 8 in the deployed configuration. FIG. 32 displays an exploded front view of a Predator-Deterring Walking Stick 100 of FIG. 31.

Referring still to the most preferred embodiment of the invention, in FIG. 1, FIG. 2, FIG. 3, FIG. 4, FIG. 5, FIG. 6, FIG. 7, FIG. 8, FIG. 9, FIG. 10, FIG. 11, FIG. 12, FIG. 13, FIG. 14, FIG. 15, FIG. 16, FIG. 17, FIG. 18, FIG. 19, FIG. 20, FIG. 21, FIG. 22, FIG. 23, FIG. 24, FIG. 25, FIG. 26, FIG. 27, FIG. 28, FIG. 29, FIG. 30, FIG. 31 and FIG. 32, a Predator-Deterring Walking Stick 100 comprises a hollow tube 102, which is comprised of a top latch lock ring 109 with a plurality of guide holes 116, a bottom latch lock ring 104 and a top opening 103; an end cap 112; a sliding actuating collar 106, which is slidably fitted to the exterior of the hollow tube 102 and which comprises a top latch 108 and a plurality of bottom latches 107; an internally housed sliding insert 150 that is controlled by the sliding actuating collar 106 using a plurality of cables 113, which are attached to the internally housed sliding insert 150, threaded through the plurality of guide holes 116 in the top latch ring 109 and attached to the sliding actuating collar; a vertical support rod 111, which distends from the internally housed sliding insert 150 and which comprises a sharpened point 140; two horizontal support rods 115, which attach to the internally housed sliding insert 150 with a hinge 117 and which comprise an unfurling shelf 146; a sheet set 120 comprising two upper sheets 123, which are connected between the vertical support rod 111 and the horizontal support rods 115, and two lower sheets 122, which are attached to the horizontal support rods 115 and which comprise a weighted end 149; a removable restraining strap 114 with a release cord 118; and a large fearsome creature image 130, which is displayed on the sheet set 120. Before deployment, the Predator-Deterring Walking Stick 100 appears and functions an ordinary walking stick with the internally housed sliding insert 150 stored at the bottom of the hollow tube 102, the sheet set 120 folded and rolled in a compact manner and held in place by the removable restraining strap 114 and unfurling shelf 146 so as to fit inside the hollow tube 102, the vertical support rod 111 concealed within the hollow tube 102, the horizontal support rods 115 held in a vertical position so that they are stored within the hollow tube, the sliding actuating collar 106 positioned at the top of the hollow tube 102 and fixed in place by the top latch 108 holding the top latch ring 109, and the end cap 112 firmly closing the top opening 103. Upon encountering a predator, a user 105 may deter the predator by disengaging the top latch 108 from the top latch ring 109 and sliding the sliding actuating collar 106 down the exterior of the hollow tube 102, thus bringing the internally housed sliding insert 150 up to the top opening 103 of the hollow tube 102, extending the vertical support rod 111 with its sharpened point 140 above the hollow tube 102, releasing the removable restraining strap 114, allowing the horizontal support rods 115 to drop to horizontal positions and stretch the two upper sheets 123 taut between the vertical support rod 111 and horizontal support rods 115, and unfurling the two lower sheets 122, thereby exposing the sheet set 120 with the large fearsome creature image 130 to the predator. Moreover, once the Predator-Deterring Walking Stick 100 is in the deployed configuration, the extended vertical support rod 111 with its sharpened point 140 allows the user 105 to use the Predator-Deterring Walking Stick 100 as an offensive or defensive pike after removing the end cap 112.

In further detail, referring now to FIG. 1, FIG. 2, FIG. 3, FIG. 4 FIG. 5, FIG. 6 and FIG. 7, a sequence of events are depicted during which a user 105 carrying a Predator-Deterring Walking Stick 100 encounters a bear 110. A Predator-Deterring Walking Stick 100 has multiple uses and deterrent systems. While on a hike or walking, a user 105 can use a Predator-Deterring Walking Stick 100 in the concealed configuration as an ordinary walking stick, as shown in FIG. 1. Upon confrontation with an angry bear 110, the user 105 begins to deploy the Predator-Deterring Walking Stick 100, as shown in FIG. 2. A sheet set 120 quickly deploys from the interior of the Predator-Deterring Walking Stick 100, displaying a fearsome creature image 130 that is substantially larger that the user 105 as shown in FIG. 3, FIG. 4 and FIG. 7. For example, a six-foot user 105 holding a Predator-Deterring Walking Stick 100 aloft could display a fearsome creature image 130 that is approximately 12-14 feet tall, which is larger than most bears. Since most predators are fearful of other larger predators, the deployed fearsome creature image 130 intimidates an approaching bear 110, thereby deterring the predator from approaching further, as shown in FIG. 4. A Predator-Deterring Walking Stick 100 also has a back up deterrent system should a bear 110 charge a user 105 after the user has deployed the fearsome creature image 130, as shown in FIGS. 5 and 6. In FIG. 5, the user 105 places the bottom of the Predator-Deterring Walking Stick 100 firmly and securely on the ground, and a sharpened point 140 on the tip of a Predator-Deterring Walking Stick 100 enables the apparatus to be used as a pike to impale a charging bear 110, as shown in FIG. 6.

In further detail, referring now to FIG. 8, FIG. 9, FIG. 10, FIG. 11, FIG. 12, FIG. 13, FIG. 14, and FIG. 15, a Predator-Deterring Walking Stick 100 is shown in its concealed configuration. In its concealed configuration, a Predator-Deterring Walking Stick 100 appears and functions as an ordinary walking stick. In the concealed configuration, the exterior of a Predator-Deterring Walking Stick 100 is configured with the sliding actuating collar 106 positioned at the top of the hollow tube 102 and fixed in place by the top latch 108 holding the top latch ring 109, and the end cap 112 firmly closing the top opening 103. In the concealed configuration, the interior of a Predator-Deterring Walking Stick 100 is configured with the internally housed sliding insert 150 stored at the bottom of the hollow tube 102 and the vertical support rod 111 is completed concealed within the hollow tube 102. The end cap 112 provides a secure storage of the sharpened point 140. In the concealed configuration, the horizontal support rods 115, which are attached to the internally housed sliding insert 150 by a hinge 117 that allows the horizontal support rods 115 to have a range of motion that sweeps 90 degrees from a vertical position to a horizontal position, are arranged in vertical positions inside of the hollow tube 102 allowing lower sheets 122, which are tightly rolled into substantially cylindrical shapes, to rest on the unfurling shelves 146 that distend from the horizontal support rods 115. Furthermore, the tightly rolled lower sheets 122 are held in place by a removable restraining strap 114, which prevents premature unfurling of the lower sheets 122 during the deployment sequence. In the concealed configuration, the upper sheets 123 are folded between the vertical support rod 111 and the horizontal support rods 115, which are in their vertical position and substantially parallel to the vertical support rod 111.

In further detail, referring now to FIG. 16, FIG. 17, FIG. 18, FIG. 19, FIG. 20, FIG. 21, FIG. 22, FIG. 23, FIG. 24, FIG. 25, FIG. 26, FIG. 27, FIG. 28, FIG. 29, FIG. 30, FIG. 31 and FIG. 32, a Predator-Deterring Walking Stick 100 is shown in the process of being deployed. The first step of deploying a Predator-Deterring Walking Stick 100 is to disengage the top latch 108 of the sliding actuating collar 106 from the top latch ring 109 of the hollow tube 102, as shown in FIG. 16. Next, the sliding actuating collar 106 is slid down the exterior of the hollow tube 102 pulling the cables 113 down the exterior of the hollow tube 102, out through the guide holes 116, and up the interior of the hollow tube 102, bringing the internally housed sliding insert 150 up from the bottom of the hollow tube 102, and extending the vertical support rod 111, the end cap 112, the folded upper sheets 123, the rolled lower sheets 122 and the horizontal support rods 115 in their vertical position, out of the hollow tube 102 through the top opening 103, as shown in FIG. 17, FIG. 18, FIG. 19, FIG. 20, FIG. 21 and FIG. 22. When the vertical support rod 111, the folded upper sheets 123, the rolled lower sheets 122 and the horizontal support rods 115 in their vertical position, are nearly completely out of the hollow tube 102, a release cord 118 is pulled taut, thereby releasing the removable restraining strap 114, as shown in FIG. 23, and allowing the horizontal support rods 115 and rolled lower sheets 122 to swing from a vertical position to a horizontal position, which is shown in FIG. 24 at the outset of the swinging motion. The user 105 completes the deployment sequence by sliding the sliding actuating collar 106 to the bottom of the hollow tube 102 and locking the bottom latches 107 into the bottom latch lock ring 104, as shown in FIGS. 24 and 25. The top of the internally housed sliding insert 150 now extends out of the top opening 103 of the hollow tube 102, as shown in FIG. 26, allowing the Predator-Deterring Walking Stick 100 to complete deployment of the upper sheets 123 and the lower sheets 122 automatically, as illustrated in FIG. 27. After locking the sliding actuating collar 106 to the bottom of the hollow tube 102, the deployment of the upper sheets 123 and the lower sheets 122 occurs by allowing the horizontal support rods 115 and rolled lower sheets 122 to swing to horizontal positions and stretch the two upper sheets 123 taut between the vertical support rod 111 and horizontal support rods 115. Next, when the horizontal support rods 115 are in their horizontal position, the two rolled lower sheets 122 unfurl and drop the weighted ends 149 to the ground, thereby exposing the upper sheets 123 and the lower sheets 122. FIG. 28 shows the sequence of deployment from the concealed configuration of a Predator-Deterring Walking Stick 100 on the left to deployed configuration of a Predator-Deterring Walking Stick 100 on the right, which is being held aloft by a user 105 who is six feet tall. FIG. 31 shows a fully deployed Predator-Deterring Walking Stick 100, and FIG. 32 illustrates an exploded view of a Predator-Deterring Walking Stick 100 in the deployed configuration.

The construction details of the invention as shown in FIG. 1, FIG. 2, FIG. 3, FIG. 4, FIG. 5, FIG. 6, FIG. 7, FIG. 8, FIG. 9, FIG. 10, FIG. 11, FIG. 12, FIG. 13, FIG. 14, FIG. 15, FIG. 16, FIG. 17, FIG. 18, FIG. 19, FIG. 20, FIG. 21, FIG. 22, FIG. 23, FIG. 24, FIG. 25, FIG. 26, FIG. 27, FIG. 28, FIG. 29, FIG. 30, FIG. 31 and FIG. 32, are as follows. The hollow tube 102 comprises wood, plastic, metal, fiberglass, composite material, or the like. The end cap 112 comprises a lightweight material that can withstand contact with the sharpened point 140, such as plastic, fiberglass, wood, balsa wood, or the like. The sliding actuating collar 106 comprises wood, plastic, fiberglass, metal, composite material, or the like. The top latch 108 and the bottom latches 107 comprise a strong material, such as plastic, metal, composite material, or the like. The internally housed sliding insert 150 comprises wood, plastic, fiberglass, metal, composite material, or the like. The cables 113 comprise metal wire, string, natural fibers, plastic fiber, artificial fiber, or the like. The vertical support rod 111 comprises wood, plastic, fiberglass, metal, composite material, or the like. The sharpened point 140 comprises wood, metal, ceramic, composite material, or the like. The horizontal support rods 115 comprise wood, plastic, fiberglass, metal, composite material, or the like. The hinge 117 comprises metal, plastic, or the like. The upper sheets 123 and lower sheets 122 comprise a thin, strong material, such as plastic sheets, paper, composite membranes, cloth, or the like. The weighted end 149 comprises wood, plastic, metal, composite material, or the like. The removable restraining strap 114 comprises wood, plastic, metal, composite material, or the like. The release cord 118 comprises metal wire, string, natural fibers, plastic fiber, artificial fiber, or the like. The materials listed herein are examples only and not intended to limit the scope of the present invention.

The advantages of the present invention include, without limitation, that it provides a convenient way of carrying a predator-deterring apparatus along while hiking or walking in the woods. Because of the large size of the displayed fearsome creature image, which could span 12-14 feet if held aloft by a six-foot person, the apparatus may be used at a safe distance from a large predator. Additionally, the rigid structure that support the membrane(s) or sheets, which displays the fearsome creature image, allows the deployed apparatus to be easily balanced while held over the head of a user. Further, the present invention offers the advantage of having a back up should the primary deterring means fail. Namely, the present invention may be used as an offensive or defensive pike to impale a charging predator and protect the user.

In broad embodiment, the present invention relates generally to an apparatus for deterring predators, which may be used as a walking stick until a predator is encountered, and which, upon encountering a predator, allows a user to rapidly deploy a collapsible rigid structure from the interior of the hollow walking stick that supports a membrane, or set of membranes, displaying the image of a fearsome creature.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiments, methods, and examples, but by all embodiments and methods that are within the scope and spirit of the invention as claimed.

What is claimed is:

1. An apparatus for deterring predators, said apparatus comprising:
 a hollow tube, said hollow tube comprising:
  a plurality of guide holes;
  a top latch lock ring,
  a bottom latch lock ring, and
  a top opening;
 a sliding actuating collar, which is slidably fitted to the exterior of said hollow tube and which is engagable with said top latch lock ring and said bottom latch lock ring;
 a plurality of cables;

an internally-housed sliding insert within said hollow tube, which is controlled by said sliding actuating collar using said cables, said cables being attached to said internally-housed sliding insert, threaded through said guide holes and attached to said sliding actuating collar;

a collapsible rigid structure capable of being collapsed and stored in said hollow tube, said collapsible rigid structure being attached to said internally-housed sliding insert; and a membrane displaying a fearsome creature image, said membrane being attached to said collapsible rigid structure, said membrane capable of being stored in said hollow tube when said collapsible rigid structure is collapsed within said hollow tube, and said membrane being held taut by said collapsible rigid structure when said collapsible rigid structure is not collapsed;

wherein said apparatus may be used as a walking stick until a predator is encountered; and wherein, upon encountering said predator, said apparatus allows a user to rapidly deploy said collapsible rigid structure from the interior of said hollow tube by sliding said sliding actuating collar down said exterior of said hollow tube, thus bringing said internally-housed sliding insert up to said top opening of said hollow tube and said collapsible rigid structure out of said top opening of said hollow tube, thereby displaying said fearsome creature image on taut said membrane and intimidating said predator.

2. An apparatus of claim 1, further comprising a plurality of depending membranes attached to said collapsible rigid structure, depending from said collapsible rigid structure, and displaying said fearsome creature image.

3. An apparatus of claim 1, further comprising a sharpened point on said collapsible rigid structure, wherein said apparatus may be used as an offensive or defensive pike.

4. An apparatus for deterring predators, said apparatus comprising:
a hollow tube, said hollow tube comprising
   a top latch lock ring with a plurality of guide holes,
   a bottom latch lock ring, and
   a top opening;
an end cap, said end cap being capable of fitting into said top opening in a tight manner;
a sliding actuating collar, which is slidably fitted to the exterior of said hollow tube, said sliding actuating collar comprising:
   a top latch and
   a plurality of bottom latches;
an internally-housed sliding insert that is controlled by said sliding actuating collar using a plurality of cables, said cables being attached to said internally-housed sliding insert, threaded through said plurality of guide holes in said top latch ring and attached to said sliding actuating collar;
a vertical support rod, which distends from said internally-housed sliding insert, said vertical support rod comprising a sharpened point;
two horizontal support rods, said horizontal support rods attaching to said internally-housed sliding insert with a hinge and said horizontal support rods comprising an unfurling shelf;
a sheet set comprising
   two upper sheets, said upper sheets being connected between said vertical support rod and said horizontal support rods, and
   two lower sheets, said lower sheets being attached to said horizontal support rods and said lower sheets comprising weighted ends;
a removable restraining strap; and
a large fearsome creature image, said large fearsome creature image being displayed on said sheet set;
wherein, before deployment, said apparatus appears and functions an ordinary walking stick with
   said internally-housed sliding insert stored at the bottom of said hollow tube,
   said sheet set folded and rolled in a compact manner and held in place by said removable restraining strap and said unfurling shelf so as to fit inside said hollow tube,
   said vertical support rod concealed within said hollow tube,
   said horizontal support rods held in a vertical position so that they are stored within the hollow tube,
   said sliding actuating collar positioned at the top of said hollow tube and fixed in place by said top latch holding said top latch ring, and
   said end cap firmly closing said top opening; and
wherein, upon encountering a predator, a user may deter said predator by disengaging said top latch from said top latch ring and sliding said sliding actuating collar down the exterior of said hollow tube, thus bringing said internally-housed sliding insert up to said top opening of said hollow tube, extending said vertical support rod with said sharpened point above said hollow tube, releasing said removable restraining strap, allowing said horizontal support rods to drop to horizontal positions and stretch said two upper sheets taut between said vertical support rod and said horizontal support rods, and unfurling said two lower sheets, thereby exposing said sheet set with said large fearsome creature image to said predator; and
wherein said user may use said apparatus with said extended vertical support rod with said sharpened point as an offensive or defensive pike.

* * * * *